(12) United States Patent
Abrams

(10) Patent No.: US 11,766,948 B1
(45) Date of Patent: Sep. 26, 2023

(54) METHOD AND SYSTEM FOR CHARGING ELECTRICAL VEHICLE FLEETS

(71) Applicant: JWA ENTERPRISES LLC, Sandy Springs, GA (US)

(72) Inventor: James A Abrams, Sandy Springs, GA (US)

(73) Assignee: JWA ENTERPRISES LLC., Sandy Springs, GA (US)

(*) Notice: Subject to any disclaimer, the term of this patent is extended or adjusted under 35 U.S.C. 154(b) by 199 days.

(21) Appl. No.: 17/145,085

(22) Filed: Jan. 8, 2021

Related U.S. Application Data

(60) Provisional application No. 62/958,549, filed on Jan. 8, 2020.

(51) Int. Cl.
  *B60L 3/12* (2006.01)
  *H02J 7/00* (2006.01)
  *B60L 53/62* (2019.01)

(52) U.S. Cl.
  CPC .......... *B60L 53/62* (2019.02); *B60L 2200/10* (2013.01); *B60L 2200/12* (2013.01); *B60L 2200/18* (2013.01); *B60L 2200/26* (2013.01); *B60L 2200/32* (2013.01); *B60L 2200/36* (2013.01); *B60L 2200/40* (2013.01)

(58) Field of Classification Search
  CPC .................. B60L 53/60–68; B60L 2260/40–48
  See application file for complete search history.

(56) References Cited

U.S. PATENT DOCUMENTS

| | | | |
|---|---|---|---|
| 8,054,038 B2 * | 11/2011 | Kelty | B60L 58/15 320/109 |
| 10,723,238 B2 * | 7/2020 | Hortop | H02J 7/0071 |
| 2012/0056583 A1 * | 3/2012 | Gotz | B60L 53/14 320/109 |
| 2012/0245750 A1 * | 9/2012 | Paul | H02J 3/003 700/291 |
| 2017/0129361 A1 * | 5/2017 | Scaringe | B60L 3/12 |
| 2019/0039465 A1 * | 2/2019 | Jang | B60L 53/665 |

* cited by examiner

*Primary Examiner* — Elim Ortiz
(74) *Attorney, Agent, or Firm* — SMITH TEMPEL; Steven P Wigmore

(57) ABSTRACT

A central controller may use an algebraic formula to control the charging of electric vehicles (EVs). The algebraic formula may provide for at least two strategies for allocating power to EV chargers: (1) focused charging to a subset of chargers or (2) a semi-level loading to all chargers. Under the focused charging strategy, the system controls the total power delivered to all chargers by providing full power to higher priority charger(s) while delaying any power to lower priority charger(s). Meanwhile, under the semi-level loading strategy, the system controls the total power delivered to all chargers by providing approximately the same power level to all chargers with specific chargers receiving more or less power based on each charger's priority. The system calculates charger priority on an ongoing basis for all chargers connected to an electric vehicle. The system may assign a charge priority value to each charger based on multiple methods.

16 Claims, 23 Drawing Sheets

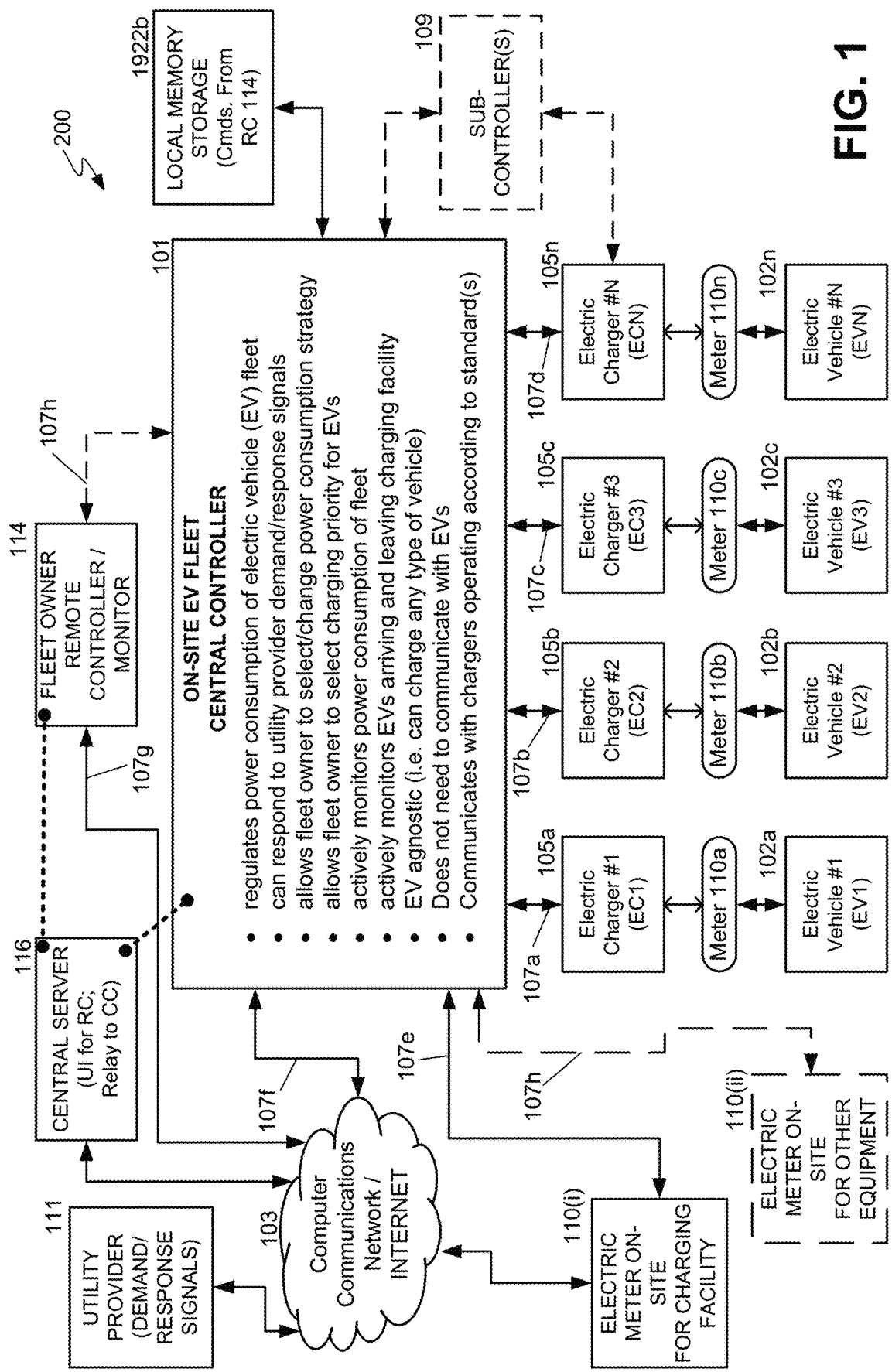

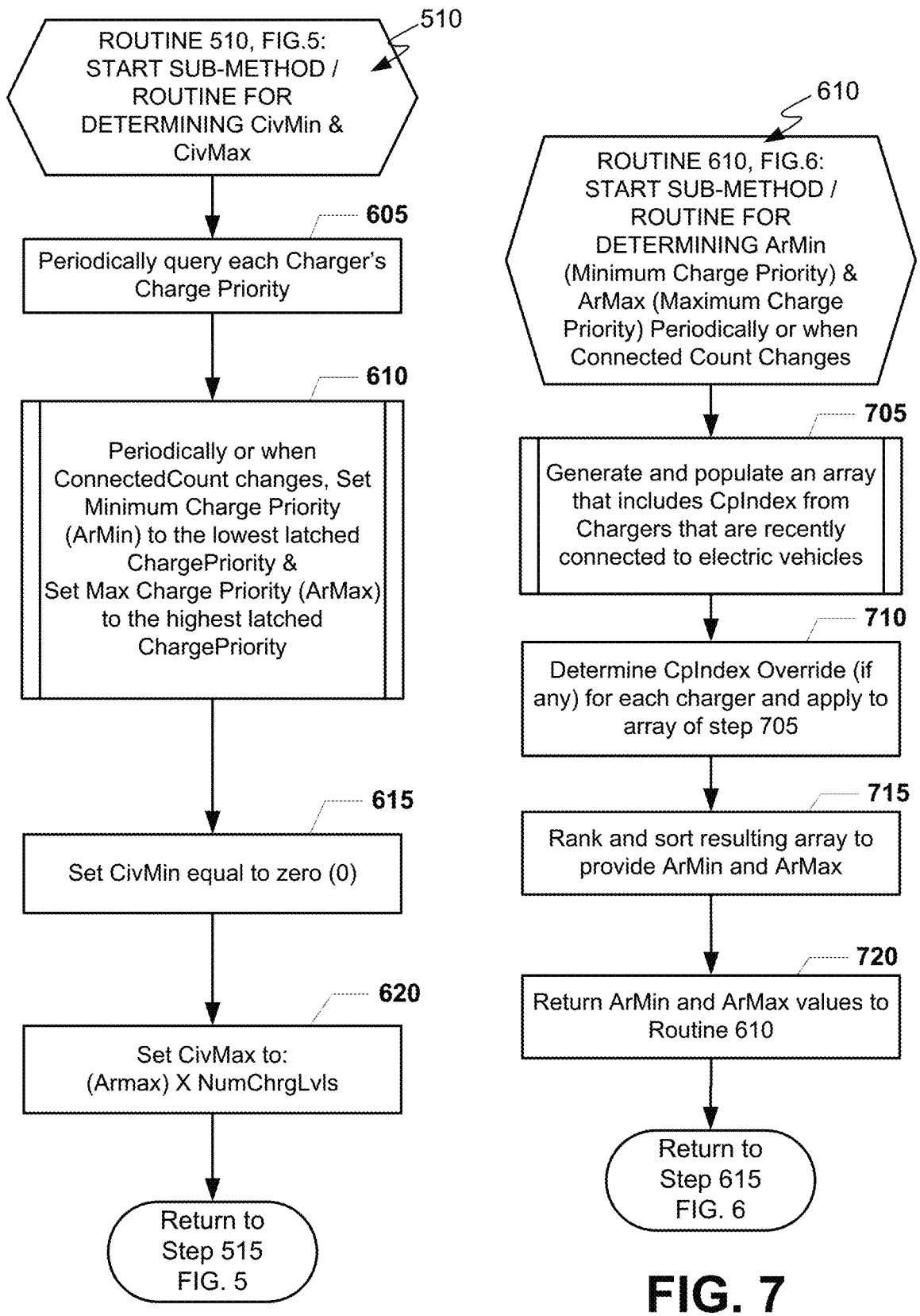

1200A

| ▶ | ⚠ | Last 7 Days ▼ | 28-Dec-20 9:31 AM EST to 04-Jan-21 9:31 AM EST | 🕒 |

EvAutoJaceHCS_50:EV_01:DepartureTime                              7 records

| Timestamp | Trend Flags | Status | Value (hr) |
|---|---|---|---|
| 28-Dec-20 11:01:54 PM EST | { } | {ok} | 23.016 hr |
| 29-Dec-20 10:29:56 PM EST | { } | {ok} | 22.487 hr |
| 30-Dec-20 10:41:56 PM EST | { } | {ok} | 22.698 hr |
| 31-Dec-20 11:03:57 PM EST | { } | {ok} | 23.062 hr |
| 01-Jan-21 10:35:52 PM EST | { } | {ok} | 22.589 hr |
| 02-Jan-21 10:36:54 PM EST | { } | {ok} | 22.613 hr |
| 03-Jan-21 10:24:53 PM EST | { } | {ok} | 22.401 hr |

| ▶ | ⚠ | Last 7 Days ▼ | 28-Dec-20 9:30 AM EST to 04-Jan-21 9:30 AM EST | 🕒 |

EvAutoJaceHCS_50:EV_01:ChargeHours                              7 records

| Timestamp | Trend Flags | Status | Value (hr) |
|---|---|---|---|
| 29-Dec-20 8:01:34 AM EST | { } | {ok} | 8.00 hr |
| 30-Dec-20 8:01:33 AM EST | { } | {ok} | 7.88 hr |
| 31-Dec-20 8:01:33 AM EST | { } | {ok} | 8.50 hr |
| 01-Jan-21 8:01:33 AM EST | { } | {ok} | 8.43 hr |
| 02-Jan-21 8:01:33 AM EST | { } | {ok} | 6.02 hr |
| 03-Jan-21 8:01:34 AM EST | { } | {ok} | 3.73 hr |
| 04-Jan-21 8:01:34 AM EST | { } | {ok} | 3.77 hr |

|  |  | Last 7 Days ▾ | 28-Dec-20 9:31 AM EST to 04-Jan-21 9:31 AM EST 🕒 |
|---|---|---|---|

EvAutoJaceHCS_50:EV_01:DepartureTime      7 records

| Timestamp | Trend Flags | Status | Value (hr) |
|---|---|---|---|
| 28-Dec-20 11:01:54 PM EST | { } | {ok} | 23.016 hr |
| 29-Dec-20 10:29:56 PM EST | { } | {ok} | 22.487 hr |
| 30-Dec-20 10:41:56 PM EST | { } | {ok} | 22.698 hr |
| 31-Dec-20 11:03:57 PM EST | { } | {ok} | 23.062 hr |
| 01-Jan-21 10:35:52 PM EST | { } | {ok} | 22.589 hr |
| 02-Jan-21 10:36:54 PM EST | { } | {ok} | 22.613 hr |
| 03-Jan-21 10:24:53 PM EST | { } | {ok} | 22.401 hr |

METHOD AND SYSTEM FOR CHARGING ELECTRICAL VEHICLE FLEETS

BACKGROUND

Conventional and prior art vehicle fleet charging systems often approach the controlling of the charging of electric vehicle fleets from a "cloud" or Internet-of-Things (IoT) perspective. That is, conventional and prior art vehicle fleet charging control systems are often designed to monitor and to control the charging of electric vehicle fleets from a central controller that is coupled to the Internet and where each vehicle communicates its charging needs and/or status over an Internet connection.

This "cloud"-centric approach can have many draw-backs. One draw-back of the cloud-centric approach is a potential system failure: Internet outages are fairly common as of this writing. And often, connecting to the Internet can require cellular or mobile phone connections which are not always reliable.

Another draw-back of cloud-centric approaches is that the central controller will usually require one or more sub-controllers closer to each electric vehicle in order to control the flow of electricity to each electric vehicle. The communications from the electric vehicles, to the central controller, and from the central controller to each of its sub-controllers can have latency issues. That is, because a central controller in a cloud-centric system is usually remote from each vehicle and each sub-controller which controls the flow of electricity, this distance between elements can contribute to significant communication lags or delays between each of the system elements.

Another draw-back of cloud-centric approaches is that they often want to know the state of charge of an electric vehicle coming-into the charge depot which needs an electric charge. The cloud-centric approaches often require each electric vehicle to have some form of telematics specifically configured to communicate each vehicle's state of charge to the central controller for the specific site [i.e. physical location] where the vehicle will be charged so that the central controller can use this state of charge to determine how it may impact the charging of the entire electric vehicle fleet.

Accordingly, there is a need in the art for a method and system for controlling the charging of electric vehicle fleets that is more reliable, less costly, requires no specific commissioning for each vehicle and is less susceptible to communication break-downs or interruptions, and which may reduce communication latency between elements of the system. There is also a need in the art for a method and system for controlling the charging of electric vehicle fleets which is more simple, yet improves, durability and reliability of the system. There is a need in the art for a method and system for charging electric vehicle fleets which does not use telematics in its electric vehicles to communicate with the central controller.

SUMMARY

A method and system for controlling the charging of an electric vehicle (EV) fleet may comprise a central controller which is proximate to the electric vehicle fleet. The central controller may comprise a control unit that is directly coupled to each electric vehicle charger of the electric vehicle fleet and which does not communicate with each electrical vehicle charger over the Internet or via any vehicle telematics: but instead, the inventive system and method relies on a direct communication link with each electric vehicle charger. This direct communication link may be wired and/or a wireless communication link. The control unit may comprise off-the-shelf hardware and/or off-the-shelf software that is programmed to control electricity flow to each electric vehicle charger by an algebraic formula described below.

The central controller is vehicle agnostic since it focuses on the electric vehicle chargers which operate according to industry standards. As of this writing, each electric vehicle charger connects to electric vehicles according to at least one of the industry standards known as SAE J1772, SAE Combo CCS and CHAdeMO amongst others. Each electric vehicle charger may be coupled to at least one electric vehicle. Each electric vehicle charger may support one or more of the following communication standards which may be used by the central controller to communicate with each charger: BACnet, Modbus, Lonworks, OCPP, MQTT, EVSE specific serial protocol, and other custom protocols used to communicate to Electric Vehicle Supply Equipment (EVSE) as understood by one of ordinary skill in the art.

The central controller monitors which electric vehicle chargers need power/electricity depending when an electric vehicle is connected to a particular charger. The central controller uses its algebraic formula to determine how much power/electricity should be distributed among the electric vehicle chargers which are requesting power/electricity at any given instant of time.

Due to the nature of electric vehicle fleets, a portion of the electric vehicle fleet may be absent/not present/not charging throughout a twenty-four hour window. For example, in a consumer services industry, such as for plumbing services, most electric vehicles (i.e. a large portion of the electric vehicle fleet) will be out during the daylight or normal working hours (i.e. between 9 AM and 5 PM) for servicing residential or commercial customers.

Meanwhile, in the evening (i.e. between 6 PM and 8 AM), a majority of the electric vehicles (a large portion) of an electrical vehicle fleet may be coupled to respective electric vehicle chargers for replenishing energy spent by respective electric vehicles. While the electrical load in the evening for the central controller in this plumbing service scenario is significantly different compared to the daylight electrical load, the central controller will usually attempt to "shape" energy/electrical flow so that the central controller attempts to manage the flow of electricity from the energy supplier throughout the twenty-four hour day.

That is, the central controller of the inventive method and system attempts to manage the amount of power/electricity during the day so that the electric vehicle fleet owner does not cause spikes in its demand for electricity when more electric vehicles require charging compared to when fewer electric vehicles are coupled to the electric vehicle chargers and require charging. Also, the central controller of the of the inventive method and system can be configured to shift some or all charging to times when the cost of electrical power/electricity is lower.

The algebraic formula used by the central controller may provide for at least two strategies for allocating power to the chargers: (1) focused charging to a subset of chargers or (2) a semi-level loading to all chargers.

Under the focused charging strategy, the system controls the total power delivered to all chargers by providing full power to higher priority charger(s) while delaying any power to lower priority charger(s). Meanwhile, under the semi-level loading strategy, the system controls the total power delivered to all chargers by providing approximately the same power level to all chargers with specific chargers receiving more or less power based on each charger's priority.

The system calculates charger priority on an ongoing basis for all chargers connected to an electric vehicle. The system assigns a charge priority value to each charger based on multiple methods.

The charge priority value may be assigned to each electrical charger based on arrival order or historical usage data or vehicle use coupled to a particular electrical charger. The charge priority value for each electric vehicle charger may be either calculated or manually assigned to each electric vehicle charger used in combination with a charge intensity variable/value (CIV) to determine the timing and intensity of charging.

The charge priority can be: 1) automatically calculated by the central controller based on arrival order of the electric vehicles, 2) automatically calculated by the central controller based on i) Average daily energy (kWh) required for each charger, ii) Average daily charging duration (time) for each charger or iii) Average departure time, 3) Manually input through a user interface for the central controller, 4) imported from an external analytic system, or 5) imported from a 3rd party system.

Meanwhile, the central controller under either the Focused Charging or Semi-Level Load strategy, may generate and also track a charge intensity variable. The charge intensity variable/value (CIV) may be used by the central controller to control fleet charge intensity (kW). The CIV lies in a numeric range that is calculated by the number of connected vehicles and the number of levels of charging supported by the electric vehicle chargers.

Regarding electric vehicle charger levels, each electric vehicle charger may have a plurality of charge levels. For example, an electric vehicle charger may have four different charge levels such as 25%, 50%, 75% and 100%. These percentages reflect how much of the maximum power (kW) available to an electric vehicle charger will be accepted by the electric vehicle charger.

Thus, in the above example the algebraic formula used by the central controller may monitor and/or calculate at least six different variable inputs for an electric vehicle fleet charging system which are as follows:

1) Strategy for the vehicle fleet: Focused Charging or Semi-Level Loading;
2) ConnectedCount—the number of electric vehicle chargers currently connected to the central controller;
3) Charge Priority-Index—to determine the priority order number assigned to each electric vehicle charger used to determine order in which connected Electric Vehicles (EVs) will be allowed to charge and at which charge Level;
4) NumChrgLvls—The number of charge levels supported by the connected electric vehicle chargers;
5) Connected Status—for each electric vehicle charger this status indicates whether a vehicle is connected and ready to charge; and
6) Charge Intensity Variable (CIV)—used by the central controller to control fleet charge intensity (kW); the CIV lies in a numeric range that is calculated by the number of connected vehicles and the number of levels of charging supported by the electric vehicle chargers.

The algebraic formula used by the central controller interprets the CIV to determine the power level for each charger which outputs at least two variables that are issued as commands to each electric vehicle charger of the electrical vehicle fleet charging system:

A) ChargeLevel—Integer value corresponding to the Charge Level for a particular electric vehicle charger; charge level values range from 0=Off to NumChrgLvls;
B) CpEnable—a boolean value that when true indicates that charging is enabled for a particular electric vehicle charger where an electric vehicle needing charge is connected to that particular electric vehicle charger.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures. For clarity, not all components are shown on drawings; the flexible conduit is shown partially—ends only, electrical components as wires, a socket and a thermoprotector are not present on drawings.

FIG. 1 is a functional block diagram illustrating a system for charging an electric vehicle fleet that may comprise a central controller which is proximate to the electric vehicle fleet;

FIG. 6 illustrates a logical flow chart for the submethod or subroutine 510 of FIG. 5 in which the central controller determines the Charge intensity value (CIV) minimum (CIVMin) and maximum (CIVMax) values described in connection with FIG. 5;

FIG. 7 illustrates a logical flow chart for the submethod or subroutine 610 of FIG. 6 in which the central controller determines minimum and maximum ChargePriorities (ArMin & ArMax) for the system;

FIG. 12A illustrates an exemplary graphical user interface display (displayable on display devices of FIGS. 19-20) for the remote controller that lists exemplary daily charge values for a single charger according to an exemplary embodiment;

FIG. 12B illustrates an exemplary graphical user interface display (displayable on display devices of FIGS. 19-20) for the remote controller that lists exemplary charge durations for a single charger according to an exemplary embodiment;

FIG. 12C illustrates an exemplary graphical user interface display (displayable on display devices of FIGS. 19-20) for the remote controller that lists exemplary departure times for a single charger according to an exemplary embodiment;

FIG. 13 illustrates an exemplary graphical user interface (GUI) display (displayable on display devices of FIGS. 19-20) for the remote controller that lists a Fleet page which provides summary status data for the chargers;

FIG. 14 illustrates an exemplary graphical user interface (GUI) display (displayable on display devices of FIGS. 19-20) for the remote controller that lists a Charger page which provides user setting inputs and status information for a single charger;

DETAILED DESCRIPTION

Figure 2A:
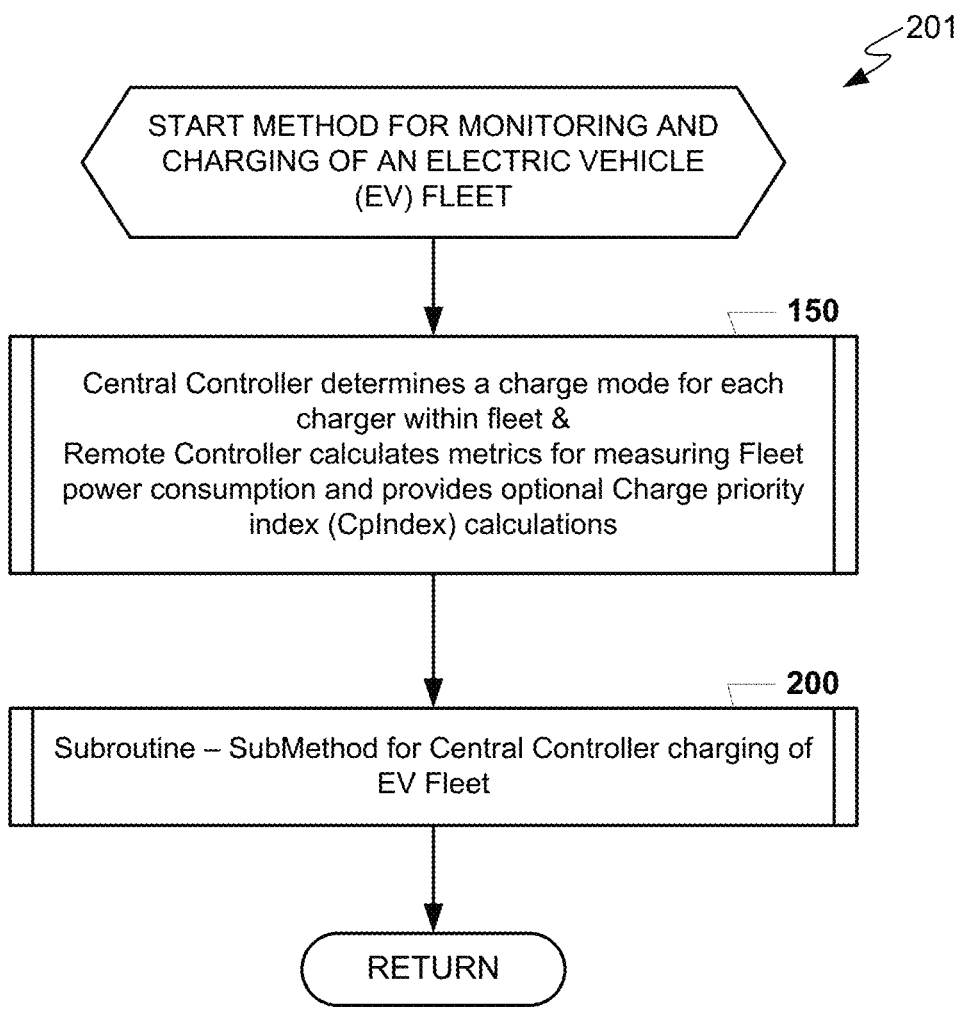
FIG. 2A illustrates a logical flow chart for a method for monitoring and charging of an electric vehicle (EV) fleet according to one exemplary embodiment of the invention.

The word "exemplary" is used herein to mean "serving as an example, instance, or illustration." Any aspect described herein as "exemplary" is not necessarily to be construed as exclusive, preferred or advantageous over other aspects.

Referring now to FIG. 1, this figure is a functional block diagram illustrating a system 200 for charging an electric vehicle (EV) fleet 102 that may comprise a central controller 101 which is proximate to the electric vehicle fleet 102. "Proximate to the vehicle fleet 102" generally means the central controller 101 may be within a line-of-site of the EV chargers 105 coupled to the central controller 101, where the central controller 101 is hard wired and/or wirelessly coupled to each EV charger 105 at an EV charging facility.

The system 200 includes a plurality of EV chargers 105a-n coupled to the central controller 101, where each EV charger (hereafter, "charger") 105 may be coupled to one or more electric vehicles (EVs) 102. The electric vehicles (EVs) 102 may comprise electric cars. However, other EVs are possible and include, but are not limited to, trucks, motorcycles, scooters, boats, trains, busses, aircraft (including aerial drones, airplanes, helicopters, etc.), military vehicles (i.e. jeeps, tanks, and other military equipment, etc.), forklifts, and remote controlled devices (i.e. robots such as, but not limited to, robots used for cleaning, manufacturing, logistics, etc.).

The system 200 may further include one or more subcontrollers 109 that may be coupled to each electric charger 105. The subcontroller 109 may relay communication signals and/or power signals from the central controller 101 to each electric charger 109 and vice-versa.

The system 200 may also include one or more electric meters 110, a computer communications network 103 (i.e. the Internet), a utility provider 111, a fleet owner remote controller/monitor 114, and a central server 116. The central controller 101 may monitor the electrical power consumption of its electric chargers 105 using each electric meter 110a-n coupled to chargers 105a-n. The central controller 101 may also monitor electrical power consumption of the entire location/facility 200 using a first electric meter 110(i).

The central controller 101 may also communicate with the utility provider 111 via the computer communications network 103. The central controller 101 may relay status information to the utility provider 111 and it may receive power demand/power-shed signals from the utility provider 111 from across the computer communications network 103 via a communications link 107f.

The communication links 107 illustrated in FIG. 1 may comprise wired or wireless communication links. Wireless communication links include, but are not limited to, radio-frequency ("RF") links, such as, BLUETOOTH™ RF links, WIFI™ RF links, as well as infrared links, acoustic links, and other wireless mediums. The computer communications network 103 may also comprise a wide area network ("WAN"), a local area network ("LAN"), or any combination of these and other types of networks as understood by one of ordinary skill in the art.

The central controller 101 may receive commands/instructions/parameters from one or more fleet owner remote controllers/monitors 114 which may communicate with the central controller 101 via a central server 116. The fleet owner remote controller 114 may comprise a portable computing device (PCD) that accesses user interfaces (UIs) (see FIGS. 12A-18) that are provided/generated by the central server 116. Each PCD 114 may take the form of a desktop computer, a laptop computer, a tablet personal computer (PC), or a mobile phone, and any combination thereof. Meanwhile, the central server 116 as well as the central controller 101 may each comprise a general purpose computer that execute the one or more algorithms described herein.

The central controller 101 regulates power consumption of electric vehicle (EV) fleet 102 and it can respond to utility provider demand/response signals. The central controller 101 allows a fleet owner 114 (via the server 116) to select/change power consumption strategy and to select charging priority for EVs as will be explained in more detail below. Further, the central controller 101 actively monitors power consumption of the fleet 102 via the meters 110 and it actively monitors EVs 102 arriving and leaving charging facility by monitoring each EC 105.

One important aspect of the system 200 and the central controller 101 is that the central controller 101 is electric vehicle (EV) agnostic (i.e. it can charge any type of vehicle). Further, the central controller 101 does not need to communicate directly with the EVs 102 and it may communicate with chargers 105 operating according to standard(s). As of this writing, each electric vehicle charger 105 operates according to at least one of the industry standards known as SAE J1772, SAE Combo CCS and CHAdeMO amongst others. Future standards are possible and are included within the scope of this disclosure as understood by one of ordinary skill in the art.

The central controller 101 may further comprise local memory storage 1922b that allows the central controller 101 to store commands and parameters sent from the server 116 which originate from the remote controller 114. This allows the central controller 101 to continue to run without any interruptions should its communication link 107f with the Internet fail and/or goes down, and/or if the server 116 and/or remote controller go down. That is, the central controller 101 can operate independently of the remote controller 114, the central server 116, and/or the Internet 103.

The system/charging facility 200 may comprise other equipment which may consume electrical power. In addition to the first electric meter 110(i) that may measure power consumption of the entire facility 200, the system/charging facility 200 may have an optional second electric meter 110(ii) [shown in dashed lines] which measures the power consumed by the other equipment outside of the EV fleet 102. The power consumed by other equipment will be referenced later as "OtherKw" as noted in FIG. 10 described below. This "OtherKw" may also be calculated by the central controller 101 when only the first electric meter 110(i) is provided and which measures the entire facility/system 200 that could have other equipment (other electrical loads) besides the EV fleet 102.

Referring now to FIG. 2A, this figure illustrates a logical flow chart 201 for a method for monitoring and charging of an electric vehicle (EV) fleet 102 according to one exemplary embodiment of the invention. Subroutine or Submethod 150 is the first step of method 201.

Figure 13:
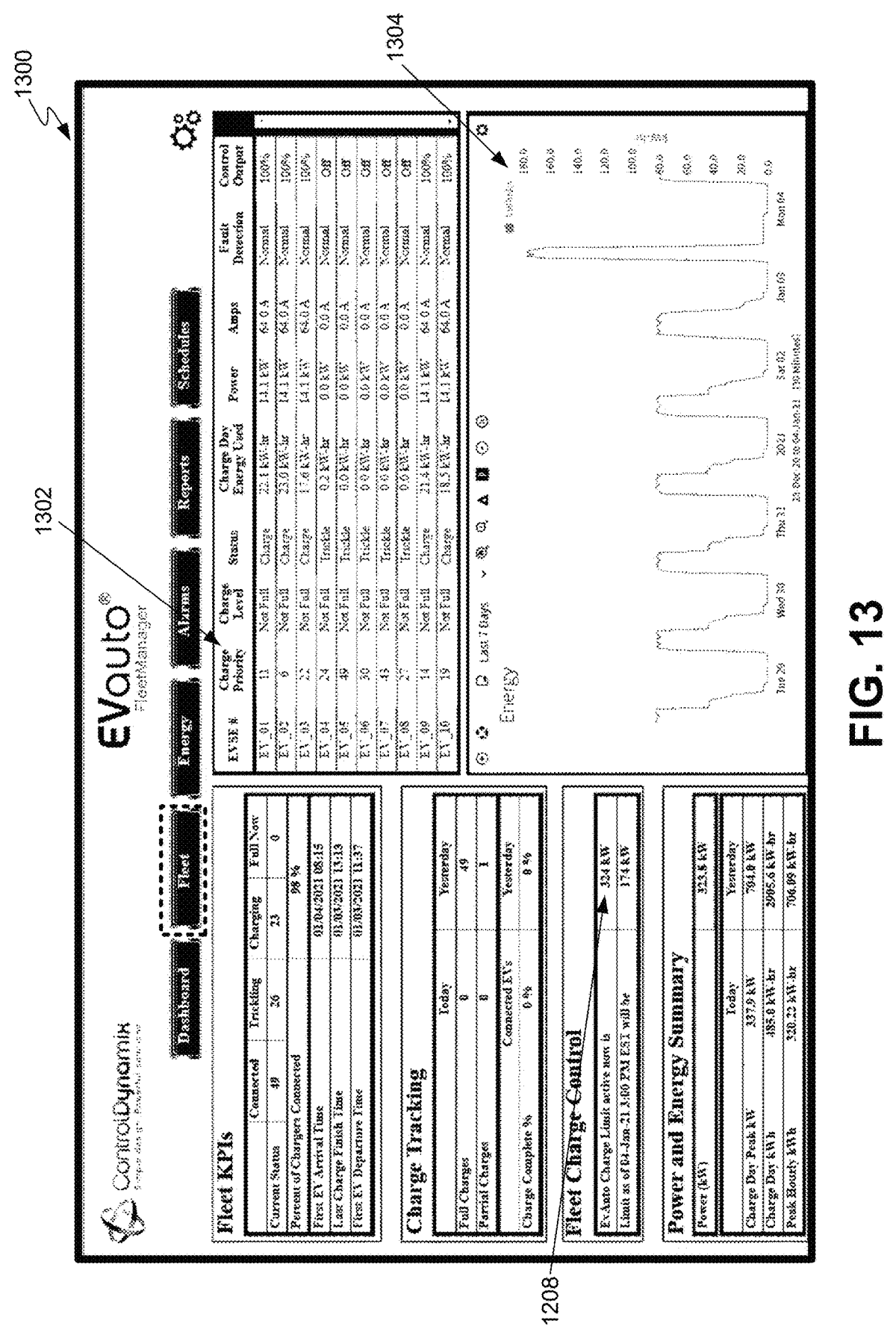

In subroutine-submethod 150, the central controller 101 determines a charge mode for each charger 105 within an electric vehicle fleet 102 and the remote controller 114 (via the server 116) calculates metrics for measuring fleet power consumption and provides optional Charge priority index (CpIndex) calculations (see CpIndex values 1302 in GUI 1300 of FIG. 13). Further details of subroutine 150 will be described below in connection with FIG. 2B.

Next, in subroutine or submethod 200, the central controller 101 starts its charging of an electrical vehicle fleet 102 that takes into account a Charger priority index (CpIndex) and a Charge intensity value (CIV) which will be described in detail below in connection with FIG. 2C. Submethod 200, shown in greater detail in FIG. 2C described below, is one of the key aspects of the inventive system 200 which is not a cloud-centric approach and provides a more reliable, less costly system that does not require any specific commissioning for each electric vehicle (EV). Submethod 200 makes the system 200 less susceptible to communication break-downs or interruptions, and which may reduce communication latency between elements of the system 200.

Figure 2B:
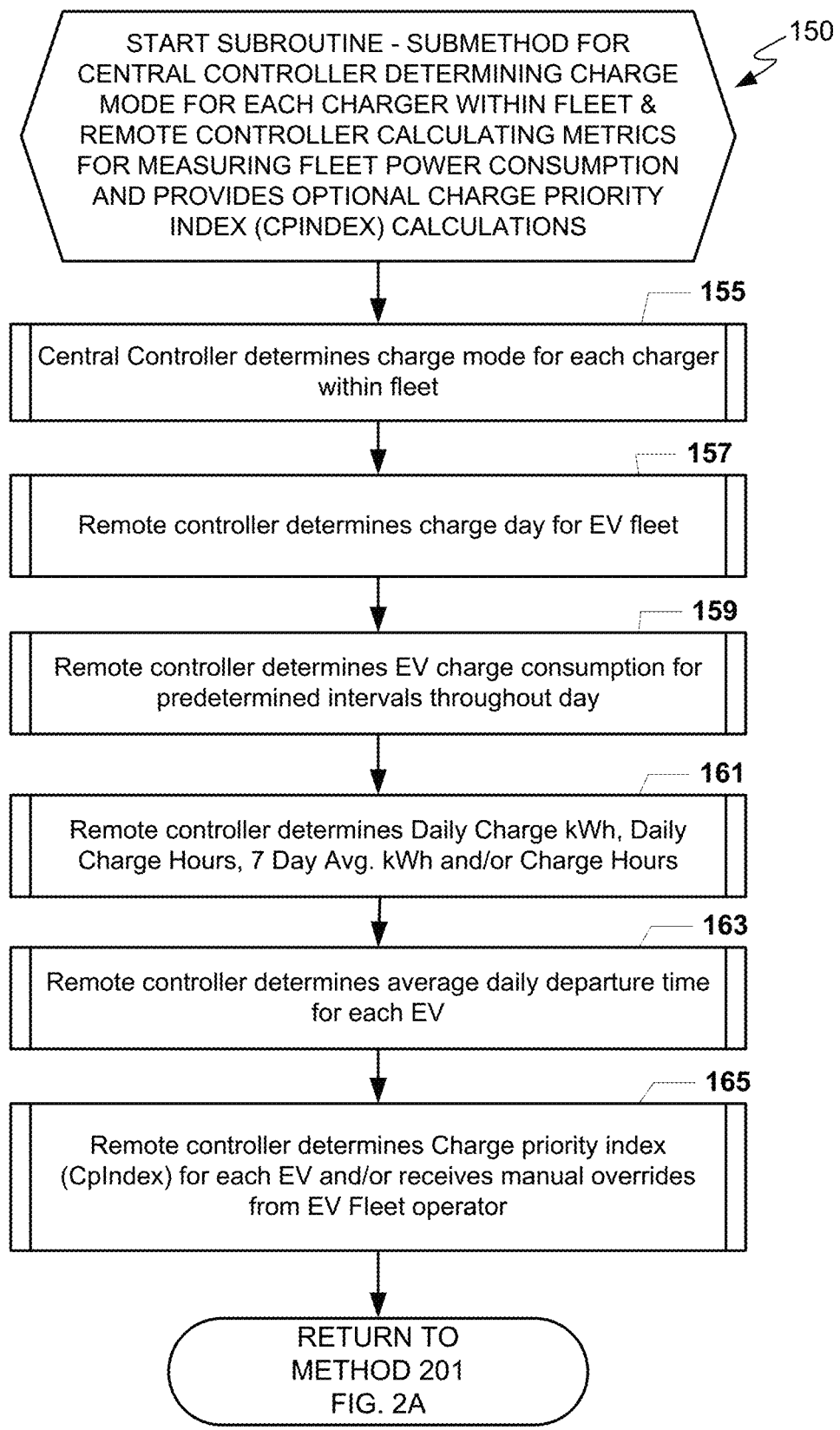
FIG. 2B illustrates a logical flow chart for the subroutine or submethod of FIG. 2A for a central controller determining the charge mode for each charger within the EV fleet and the remote controller calculating metrics for measuring fleet power consumption and providing an optional Charge priority index (CpIndex)

Referring now to FIG. 2B, this figure illustrates a logical flow chart for a subroutine or submethod 150 of FIG. 2A for a central controller 101 determining the charge mode for each charger 105 within the EV fleet 102 and the remote controller 114 (via the server 116) calculating metrics for measuring fleet power consumption and providing an optional Charge priority index (CpIndex). Subroutine 155 is the first step of subroutine 150.

In subroutine 155, the central controller 155 may determine a charge mode for each charger 105. In this subroutine 155, the central controller 101 determines for each charger 105 whether it is in one of the following five (5) modes of operation: (1) trickle charge; (2) idle; (3) normal charge (4) fault condition; and (5) the charger is turned off. For the determining the trickle charge, idle, and normal charge modes of operation, the central controller 101 may monitor a power meter 110a-n connected to each charger 105a-n. The fleet owner via the remote controller 114 (via the server 116) may provide one or more of the following parameters to the central controller 101 for determining a charger mode: a setting for the minimum amperage before the charger is considered in Charge Mode; a time first period an amps level must be above before a mode is considered to be in trickle charge mode; and a second time period that an amps level must be above before a mode is considered to be in normal charge mode.

Next, in subroutine 157, the remote controller 114 (via the server 116) may determine a charge day for the EV fleet 102. In this subroutine 157, the charge day may comprise an adjustable twenty-four (24) hour period used the remote controller 114 (via the server 116). For EV fleet owners where charging operations may occur overnight, the charge day allows the remote controller 114 (via the server 116) to calculate daily usage that spans across midnight. The charge day is used in subroutine 161 and may be used in various graphical reports that can be displayed on display devices 1947 for the remote controller 114 (via the server 116) and/or the central controller 101.

After subroutine 157, next in subroutine 159, the remote controller 114 (via the server 116) may determine EV charge consumption for predetermined intervals throughout a charge day. In this subroutine 159, the remote controller 114 (via the server 116) may record the amount of energy and time used by each charger for predetermined time intervals, such as, but not limited to, every 15 minutes. Other time intervals greater or smaller are possible and are included within the scope of this disclosure. If an EV fleet owner sets the central controller 101 to prioritize charging by either 7DayAveragekWh or 7DayAverageChargeHours, this subroutine 159 may output values used to help determine the Charge priority index (CpIndex) for each charger 105 that will be described in more detail below. The remote controller 114 (via the server 116) may use a numeric value from the power meter 110a-n for each charger 105. Each power meter 110a-n assigned to each charger 105 may measure cumulative energy usage at each charger 105 in Kilowatt-Hours, or other units as appropriate.

Next, in subroutine 161, the remote controller 114 (via the server 116) may determine the kWh used by an individual charger 105 over a 24 hour period and the time duration of charging over a 24 hour period. See FIG. 12A which illustrates an exemplary graphical user interface display 1200A (displayable on display devices 1947 of FIGS. 19-20) that lists exemplary daily charge values for a single charger 105 according to an exemplary embodiment. See FIG. 12B which illustrates an exemplary graphical user interface display 1200B (displayable on display devices 1947 of FIGS. 19-20) that lists exemplary charge durations for a single charger 105 according to an exemplary embodiment. FIGS. 12A-12B will be described in further detail below.

Subsequently, in subroutine 163, the remote controller 114 (via the server 116) may determine the average daily arrival and departure times (see FIG. 12A for UI 1200 listing departure times) for each EV 102. In this submethod 163, the remote controller 114 may record the daily time when each charger 105 is connected and/or disconnected from its respective EV 102. If an EV fleet owner sets the central controller 101 to prioritize charging by the average departure time, this subroutine 159 may output values used to help determine the Charge priority index (CpIndex) for each charger 105 that will be described in more detail below.

It is noted that the remote controller 114 (via the server 116) may allow the EV fleet owner to set a predetermined delay, i.e. such as on the order of one minute, two minutes, three minutes, etc. etc., to allow for the brief unplugging of an EV 102 from a charger 105 without impacting the departure time calculation made by the remote controller 114. See FIG. 12C which illustrates an exemplary graphical user interface display 1200C (displayable on display devices 1947 of FIGS. 19-20) that lists exemplary departure times for a single charger 105 according to an exemplary embodiment. FIG. 12C will be described in further detail below. See also FIG. 18 which has a GUI 1800 and charger mode settings 1802, that includes delays which may be set.

Next, in subroutine 165 of FIG. 2B, the remote controller 114 (via the server 116) may help determine the Charge priority index (CpIndex) described in more detail below. The central controller 101, as explained in more detail below, may also determine the CpIndex and may work in conjunction with the remote controller 114 (via the server 116) to determine the CpIndex assigned to each charger 105. In this subroutine 165, the remote controller 114 (via the server 116) may automatically monitor and calculate trends in data about each charger 105. Such trends may allow the remote controller 114 (via the server 116) to determine the CpIndex for each charger 105 and relay these values to the central controller 101. Alternatively, or in addition to, the central controller 101 or the remote controller 114 (via the server 116) may receive manual overrides for CpIndex values from the EV fleet owner (see GUI 1400 of FIG. 14 and specifically 1408 of FIG. 14) or from another external source.

In subroutine 165, as but one example, an EV Fleet owner may assign two chargers 105a, 105b with the first and second highest CpIndex values such that chargers 105a, 105b will always receive the highest priority as used in one of the two charging strategies described below in connection with FIG. 2C (see GUI 1400 of FIG. 14 and specifically 1408 of FIG. 14). Meanwhile, the EV fleet owner may allow either the remote controller 114 (via the server 116) and/or the central controller to automatically determine the CpIndex values for chargers 105C-105N, which may be based on trends of data (such as, but not limited to, EV departure times, EV arrival times, and/or kwH daily consumption, etc.).

Figure 14:
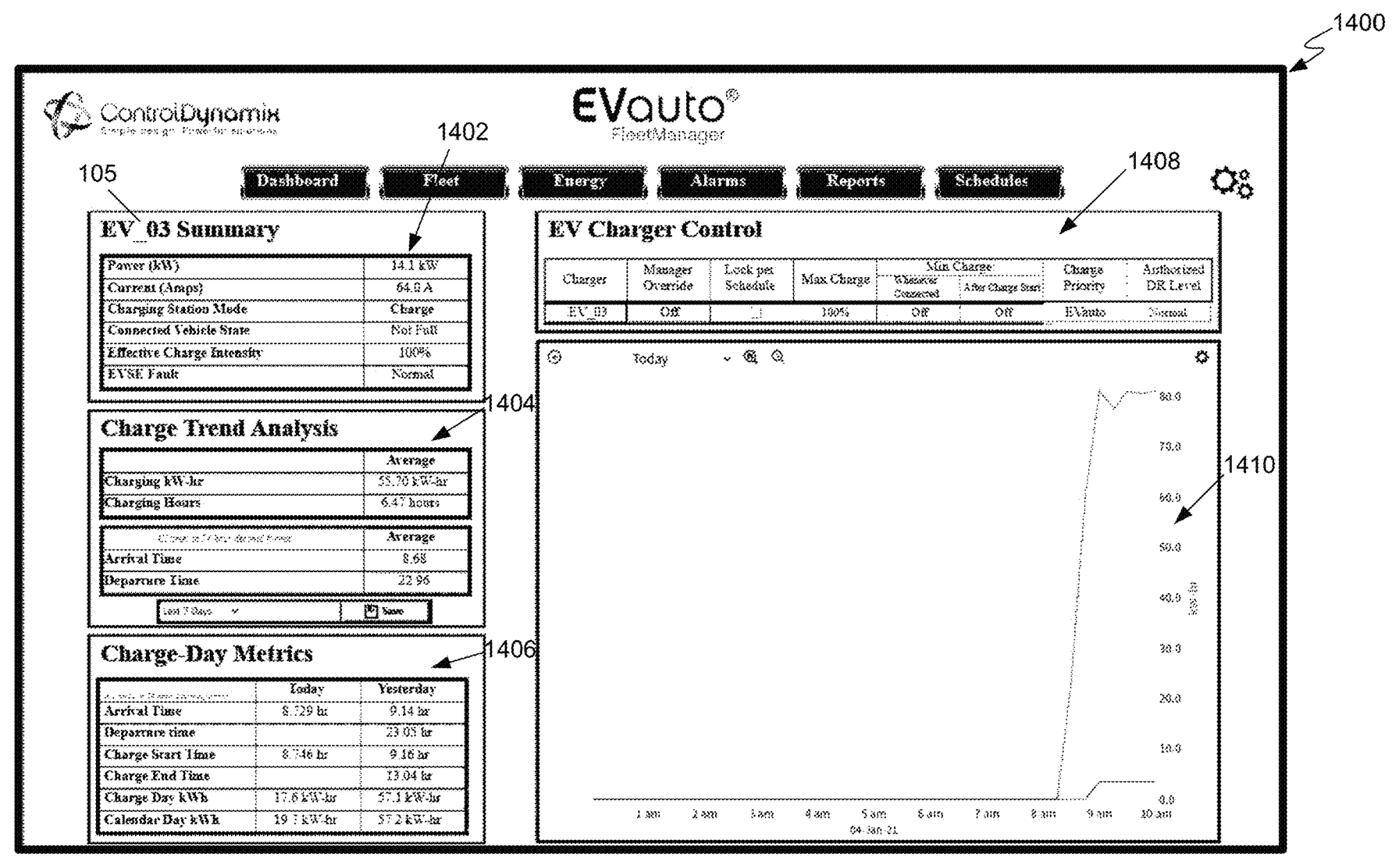

An EV fleet owner may enter the manual CpIndex override values using a display device 1947 (see FIGS. 19-20) which may display one or more of the graphical user interfaces 1300-1400 of FIGS. 13-14. See particularly graphical user interface 1300, where an operator/EV fleet owner may manually enter CpIndex values 1302 via the interface 1300. After subroutine 165, the submethod 150 may return to method 201 of FIG. 2A.

Figure 2C:
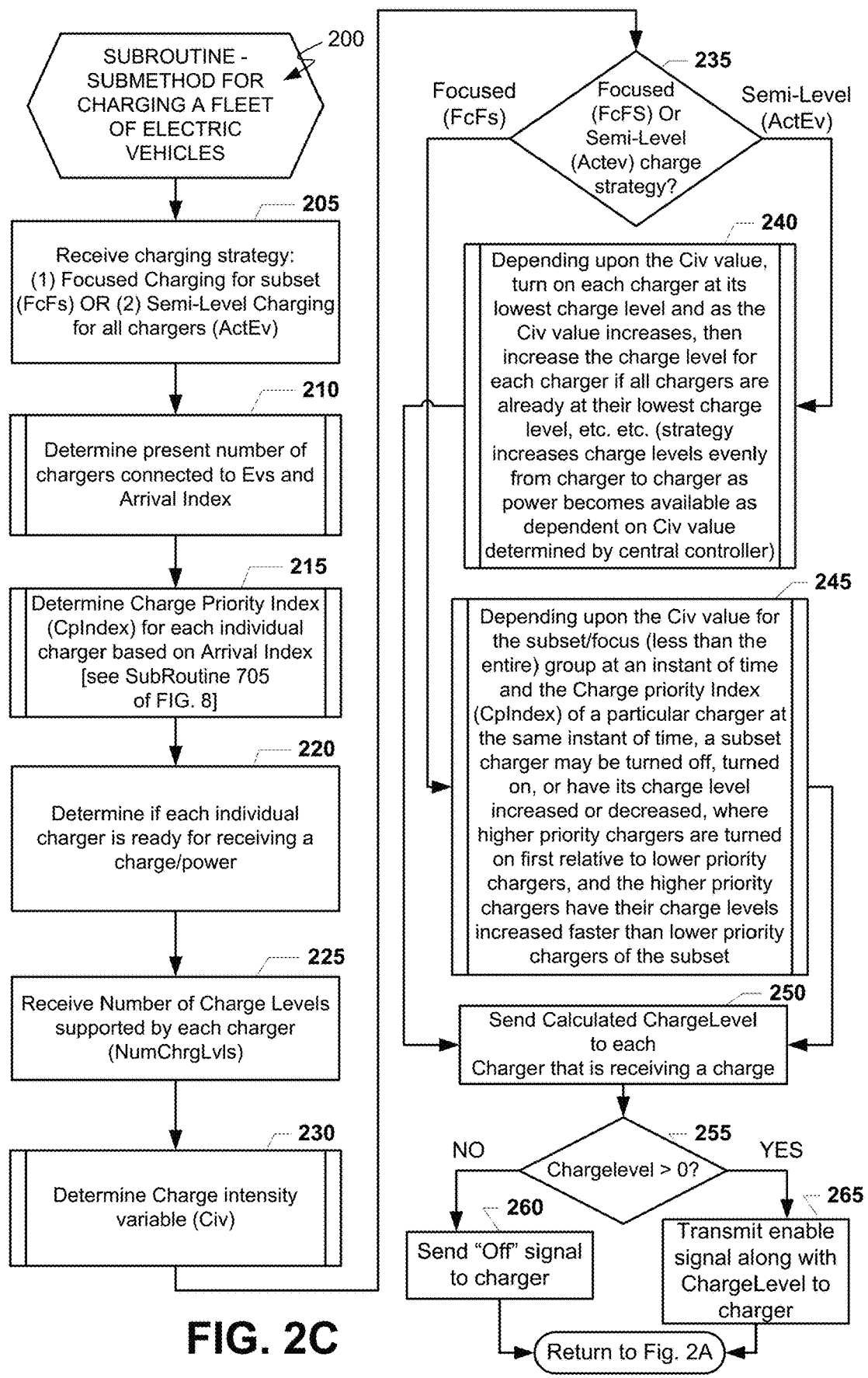
FIG. 2C illustrates a logical flow chart diagram for a method for charging a fleet of electric vehicles (EVs) according to one exemplary embodiment of the invention.

Referring now to FIG. 2C, this figure illustrates a logical flow chart diagram for a method 200 for charging a fleet of electric vehicles according to one exemplary embodiment of the invention. Step 205 is the first step of method 200.

As noted above, Submethod 200 is one of the key aspects of the inventive system 200 which is not a cloud-centric approach and provides a more reliable, less costly system that does not require any specific commissioning for each electric vehicle (EV). Submethod 200 makes the system 200 less susceptible to communication break-downs or interruptions, and which may reduce communication latency between elements of the system 200.

In step 205, the central controller 101 receives a charging strategy. The charging strategy may comprise two or more different strategies which may impact how the central controller 101 distributes electrical power among electrical chargers of the fleet which are coupled to electric vehicles and are ready for electrical charging.

According to one exemplary embodiment, two charging strategies may include: (1) Focused Charging (a.k.a. First Come First Serve [FcFs]) and (2) Semi-Level charging for all chargers (a.k.a. ActEv). Focused Charging is usually designed for a subset or smaller amount of electric chargers which are less than the number of chargers which may be ready to charge electric vehicles. Meanwhile, Semi-Level charging is designed for all chargers which have electric vehicles connected and are ready for charging the vehicles.

A fleet owner, using the remote controller 114 (via the server 116), may switch between these two charging strategies at any point of time during a twenty-four hour interval. The fleet owner may switch the charging strategies manually, or the fleet owner may set conditions such that the central controller 101 can switch between these two charging strategies based on the one or more set/predetermined conditions.

Next, in subroutine or submethod 210, the central controller 101 may determine the present number of chargers that are connected to electric vehicles (EVs). Each charger may send a connected status signal to the central controller 101. Further details of subroutine 210 are describe below in connection with FIG. 11.

Subsequently, in subroutine or submethod step 215, the central controller may determine and/or receive the Charge priority Index (CpIndex) for each individual charger which is connected as determined in subroutine 210. According to one exemplary embodiment, a fleet owner may set the CpIndex for each charger manually using the remote controller 114 (via the server 116). However, this manual setting of the CpIndex is generally less preferred. For example, a fleet owner, operating the remote controller 114 (via the server 116), may assign numbers to each charger and assign the CpIndex based on those numbers. Suppose a fleet owner has twenty different chargers: the fleet owner may label each charger with a number and assign its CpIndex based on that number. So, Charger #1 may have the highest priority, while Charger #20 may have the lowest priority or lowest CpIndex.

According to another exemplary embodiment, the CpIndex for each charger may be automatically determined by the central controller 101 based on the order/sequence in which vehicles are connected to each respective charger 105. The central controller 101 may determine the CpIndex for each charger based on average daily energy consumed by each charger 105.

The central controller 101 may determine the CpIndex for each charger 105 based on levels of use for a charger 105, where a higher use charger 105 is provided with a priority which is higher compared to a charger 105 which is rarely used to charge a vehicle. The central controller 101 may determine the CpIndex for each charger 105 based on number of hours a vehicle is connected to a particular charger 105 (i.e. charge hours—See FIG. 12B) and/or total energy (kWh) used.

The central controller 101 may also determine the CpIndex for each charger 105 based on departure time (i.e. time of day the electric vehicle is first disconnected from a charger 105) and/or based on arrival time (i.e. time of day a vehicle is first connected to a charger 105). The central controller 101 may receive one or more third party strategies, external to the system 100, which may instruct the central controller 101 on how to calculate priority for each charger 105. Further details of subroutine 215 are described below in connection with FIG. 8.

Next, in subroutine or submethod 220, the central controller 101 determines if each individual charger 105 is ready for receiving a charge/power from the central controller 101. This subroutine 220 is determining if the charger 105 is running OK or if it is in a fault/malfunction condition.

Subsequently, in step 225, the central controller 101 may receive the number of charge levels supported by each charger (NumChrgLvls). For example, a four-level charger 105 may have the four charging levels of 25%, 50%, 75%, and 100%. In most cases, a vehicle fleet will often use the same type of vehicle charger 105 which means that each charger 105 will usually have the same number of levels for charging. However, it is possible for a vehicle fleet to have different chargers 105 with different numbers of charging levels (i.e. a four level charger 105—having 25%, 50%, 75%, & 100% and a two-level charger 105 of 50% & 100%).

In such a scenario, each charger 105 may have its own central controller 101. That is, all four-level chargers 105 may be coupled and operated by a first central controller 101a, while all two-level chargers 105 may be coupled and operated by a second central controller 101b. And in a multi-central controller scenario, a CpIndex may be assigned among the separate central controllers 101.

Subsequently, in subroutine or submethod 230, the central controller 101 determines the Charge intensity variable (CIV). The CIV value controls how much power can be distributed by the central controller 101 among the fleet of chargers 105 (coupled to electric vehicles 102). The CIV variable may be analogized as an accelerator in an automobile: the higher the CIV, the faster or more power may be distributed by the central controller 101; similarly, the lower the CIV, the slower or less power may be distributed by the central controller 101 among the chargers 105 ready to receive a charge and depending upon the charging strategy selected by the vehicle fleet owner using the remote controller 114 (via the server 116).

In other words, the CIV controls the power setting for a particular electric vehicle fleet. Subroutine 230 reviews power meter levels and may adjusts the CIV based on power meter level readings. Further, the number of electric vehicles connected to respective chargers 105 also impacts the CIV value. Also, subroutine 210 and subroutine 220 may also impact the CIV value at a given instant of time. Subroutine 230 is constantly running in the background relative to method 200 so that the central controller 101 is updating the CIV based on the parameters mentioned above, which includes, but is not limited to, power meter readings, power demand signals from a utility provider, subroutine 210 that includes the number of vehicles connected, subroutine 220 that includes determining if a charger 105 is ready to supply a charge to an electric vehicle, etc. Further details of subroutine 230 are described below in connection with FIG. 5 below.

After subroutine 230, the method 200 proceeds to decision step or decision block 235 where the central controller 101 may access memory storage from step 205 to determine which charging strategy is currently active: (1) Focused charging (FcFs) strategy OR (2) Semi-Level (ActEv) charging strategy. If the inquiry to decision step 235 is Focused (FcFs) then the method 200 proceeds to subroutine 245. If the inquiry to decision step 235 is Semi-Level charging (ActEV) then the method 200 proceeds to subroutine 240. (See FIG. 16 and GUI 1600, and particularly 1602 for receiving selection of a charging strategy.)

In subroutine or submethod 240, the central controller 101 determines the charge level for each charger 105 according to the Semi-Level charging (ActEv) strategy. According to this strategy, depending upon the CIV value, each charger 105 is usually turned-on at its lowest charge level. And as the CIV value increases, then charge level for each charger 105 is increased if all chargers 105 are already at their lowest charge level, etc. etc. (this strategy increases charge levels evenly from charger 105 to charger 105 as more power becomes available or as vehicles 102 become fully charged and cease to consume energy as dependent on the CIV value determined by the central controller).

Meanwhile, in subroutine or submethod 245, for Focused charging (FcFs), depending upon the CIV value for the subset/focus (less than the entire) group at an instant of time and the Charge priority Index (CpIndex) of a particular charger 105 at the same instant of time, a subset charger 105 may be: (1) turned off, (2) turned on, or (3) have its charge level increased or decreased. Higher priority chargers 105 are usually turned on first relative to lower priority chargers 105, and the higher priority chargers 105 have their charge levels increased faster than lower priority chargers 105 of the subset.

It is noted that subroutine or submethod 230 allows the central controller 101 to determine the CIV value. Meanwhile, subroutines or submethods 240 and 245 allow the central controller 101 to interpret how the CIV value at an instant of time may impact each charger 105 that is to receive a charge from the central controller 101. That is, subroutines or submethods 240 use the CIV value to calculate if a particular charger 105 is turned on AND at what charge level at a given instant of time.

Referring back to FIG. 2C, in step 250, based on the output from either subroutine or submethods 240 or 245, the calculated ChargeLevel is sent from the central controller 101 to a charger 105 receiving a charge. Subsequently, in decision step 255, the central controller 101 determines if the Output value from either subroutine 240 or subroutine 245 is greater than zero (0). If the inquiry to decision step 255 is positive, meaning that a Chargelevel greater than zero (0) has been determined, then the "Yes" branch is followed to step 265. If the inquiry to decision step 255 is negative, meaning that the Output value or charge level from either subroutine 240 or 245 is zero (0), then the central controller sends an "off" signal where a charger 105 is turned "off" and/or put in a "ready" state but does not receive any power from the central controller 101.

It is noted in this decision step 255, other conditions may be added in order to "activate" or "deactivate" a particular charger 105. For example, in addition to the first non-zero charge level condition that is checked, the central controller 101 may also check a second condition such as whether payment has been received from a user of the charger 105. That is, in a "public" fleet charging context, i.e. such as for a public parking lot equipped with the chargers 105, then the central controller 101 can also determine if a charger 105 has received payment for continued power from the central controller. If the second condition is not met, i.e. is negative, then the "No" branch may be followed to step 260 in which the charger 105 is turn turned "off" and/or put in a "ready" state but does not receive any power from the central controller 101. After steps 260 and 265, the method 200 returns to the first step 205.

Figure 3:
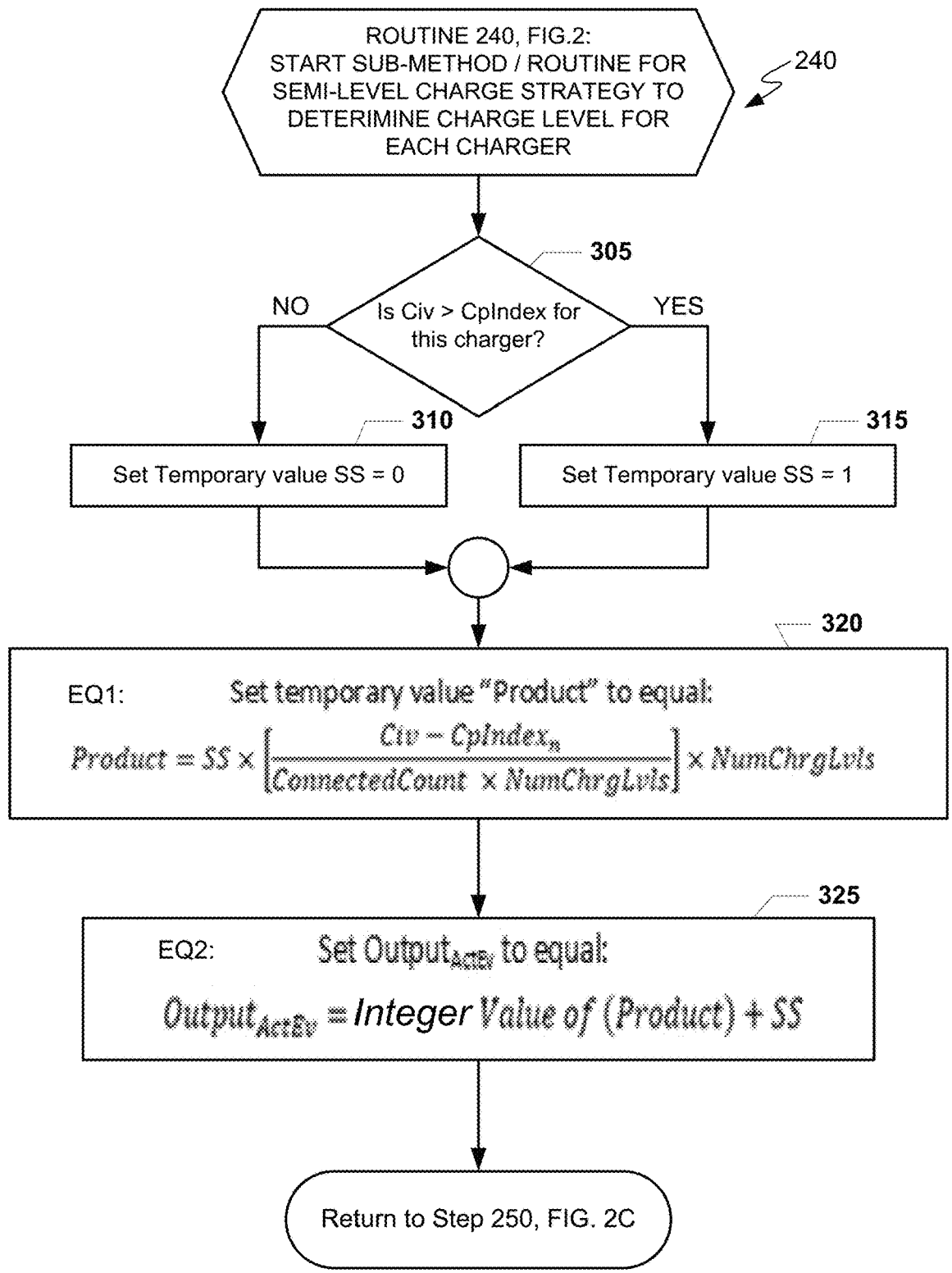
FIG. 3 illustrates a logical flow chart for the submethod or subroutine 240 of FIG. 2C in which the central controller determines the charge level for a particular charger based on the Semi-Level (ActEv) charging strategy described in connection with FIG. 2C.

Referring now to FIG. 3, this figure illustrates a logical flow chart for the submethod or subroutine 240 of FIG. 2C in which the central controller 101 determines the charge level for a particular charger 105 based on the Semi-Level (ActEv) charging strategy discussed above in connection with FIG. 2C. Decision step 305 is the first step of subroutine 240.

As noted previously, the central controller 101 may create an object for each charger 105 which is receiving a charge from the central controller 101. This means that the central controller 101 creates an instance for subroutine 240 for each charger 105 that is receiving a charge under the selected Semi-Level (ActEv) charging strategy.

In decision step 305, the central controller 101 determines if the Charge intensity value (CIV) is greater than the Charge priority index (CpIndex) assigned to a particular charger 105. If the inquiry to decision step 305 is negative, meaning that the CIV is less than or equal to the CpIndex, then the "No" branch is followed to step 310. If the inquiry to decision step 305 is positive, meaning that the CIV is greater than the CpIndex, then the "Yes" branch is followed to step 315.

In step 310, a first temporary value "SS" is assigned a value of zero (0). Meanwhile, in step 315, the first temporary value is assigned a value of one (1).

Next, in step 320, a second temporary value "Product" is set equal to a first equation (EQ1) which is listed below:

$$\text{Set temporary value "Product" to equal:}$$
$$\text{Product} = SS \times [Civ - CpIndex_n] / ConnectedCount \times NumChrgLvls] \times NumChrgLvls \quad \text{EQ1:}$$

where, the CIV value of EQ1 is determined in subroutine 230 of FIG. 2C described above, the CpIndex value of EQ1 is determined in subroutine 215 of FIG. 2C described above, and the NumChrgLvls of EQ1 is determined in step 225 of FIG. 2C described above.

Subsequently, in step 325, an Output(ActEv)value is set equal to a second equation (EQ2) listed below:

$$\text{Set Output}_{ActEv} \text{ to equal: Output}_{ActEv} = \text{Integer Valve of (Product)} + SS \quad \text{EQ2:}$$

where the Product value of EQ2 is determined in step 320, while the SS value of EQ2 is determined in either step 310 or step 315 described above. This Output(ActEv) value is the new charge level for the charger 105 being evaluated by the central controller 101 using the Semi-Level (ActEv) charge strategy which is based on Equations EQ1 & EQ2 described above. Next, subroutine 240 returns this Output (ActEv) value to step 250 of FIG. 2C.

Figure 4:
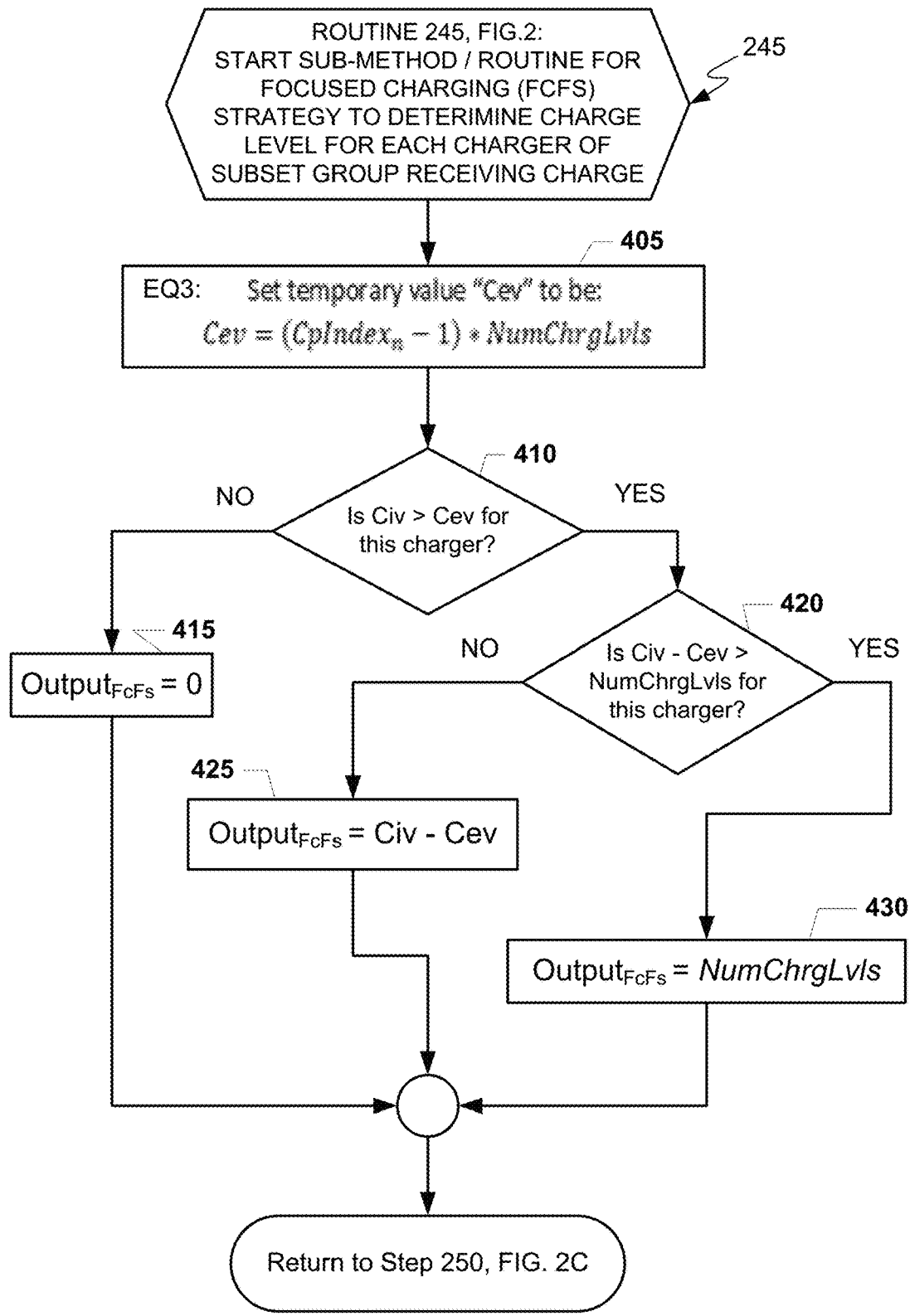
FIG. 4 illustrates a logical flow chart for the submethod or subroutine 245 of FIG. 2C in which the central controller determines the charge level for a particular charger based on the Focused subset (FcFs) charging strategy described in connection with FIG. 2C.

Referring now to FIG. 4, this figure illustrates a logical flow chart for the submethod or subroutine 245 of FIG. 2C in which the central controller 101 determines the charge level for a particular charger 105 based on the Focused subset (FcFs) charging strategy discussed above in connection with FIG. 2C. Decision step 405 is the first step of subroutine 245.

As noted previously, the central controller 101 may create an object for each charger 105 which is receiving a charge from the central controller 101. This means that the central controller 101 creates an instance for subroutine 245 for each charger 105 that is receiving a charge under the selected Focused subset (FcFs) charging strategy.

Step 405 is the first step of subroutine 245. In step 405, a third temporary value "Cev" is set equal to a third equation (EQ3) as follows:

$$\text{Set temporary value "Cev" to be: Cev} = (CpIndex_n = 1) * NumChrgLvls \quad \text{EQ3:}$$

where CpIndex of EQ3 is determined in subroutine 215 of FIG. 2C described above, and NumChrgLvls of EQ3 is determined in step 225 of FIG. 2C described above.

Next, in decision step 410, the central controller determines if the Charge intensity value (CIV) is greater than the Cev for this particular charger 105. If the inquiry to decision step 410 is negative, meaning that the CIV value is less than or equal to the Cev value, then the "No" branch is followed to step 415. If the inquiry to decision step 410 is positive, meaning that the CIV value is greater than the Cev value, then the "Yes" branch is followed to decision step 420.

In step 415, an Output(FcFs) value is set equal to zero (0). This Output(FcFs) value is the charge level set for this particular charger 105 being evaluated in subroutine 245. A zero (0) charge level means that the present charger 105 will receive no energy or power from the central controller. From this step 415, the subroutine 245 returns this zero (0) value to step 250 of FIG. 2C.

In decision step 420, the central controller 101 determines if the CIV value minus the Cev value is greater than the NumChrgLvls for this charger 105. If the inquiry to decision step 420 is negative, meaning that the CIV value minus the Cev value is less than or equal to the NumChrgLvls, then the "No" branch is followed to step 425. If the inquiry to decision step 420 is positive, meaning that the CIV value minus the Cev value is greater than the NumChrgLvls, then the "Yes" branch is followed to step 430.

In step 425, the Output (FcFs) value, which is the charge level set for this particular charger 105 being evaluated in subroutine 245 as mentioned above, is set equal to the CIV value minus the Cev value. This usually means that that the current charger 105 being evaluated by subroutine 245 is increased to its next level of charging in this step 425.

Meanwhile, in step 430, the Output (FcFs) value is set equal to the NumChrgLvls. This step 430 means that the present charger 105 being evaluated by subroutine 245 is increased to its maximum charge level in this step.

This Output (FcFs) value from either steps 415, 425, or 430 is the new charge level for the charger 105 being evaluated by the central controller 101 using the Focused subset (FcFs) charge strategy which is based on Equation EQ3 and decision steps 410 and 420. Subsequently, from either steps 415 or 425 or 430, the Output (FcFs) value is returned from subroutine 245 to step 250 of FIG. 2C.

Figure 5:
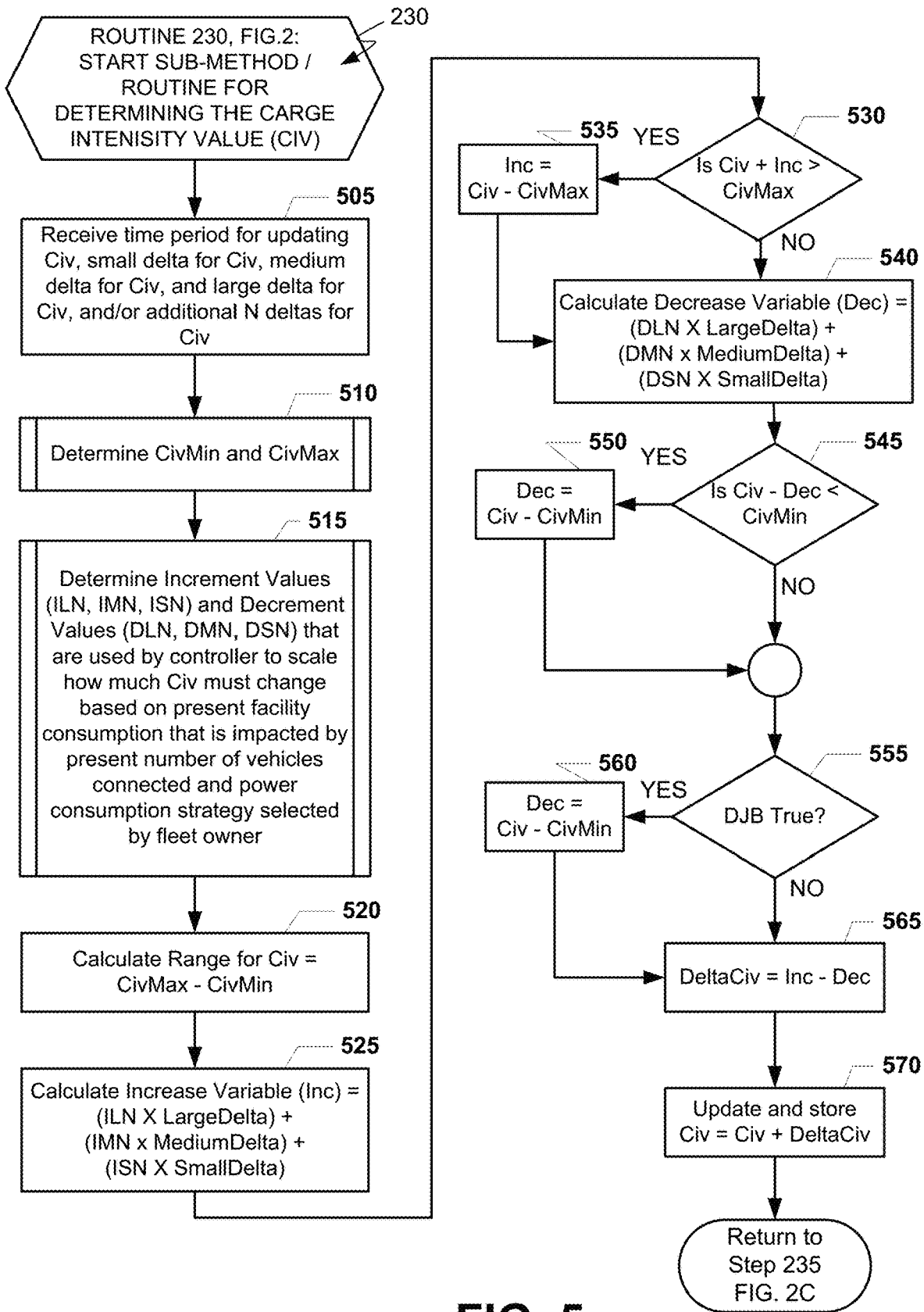
FIG. 5 illustrates a logical flow chart for the submethod or subroutine 230 of FIG. 2C in which the central controller determines the Charge intensity value (CIV) described in connection with FIG. 2C.

Referring now to FIG. 5, this figure illustrates a logical flow chart for the submethod or subroutine 230 of FIG. 2C in which the central controller 101 determines the Charge intensity value (CIV) discussed above in connection with FIG. 2C. Step 505 is the first step of subroutine 230. In step 505, the central controller 101 may receive a time period for updating the CIV, as well as values for a small delta for the CIV, a medium delta for the CIV, and a large delta for the CIV. These parameters may be received by the central controller 101 from the remote controller 114 (via the server 116) which may be operated by the fleet owner.

As noted above, the time period for updating the CIV can be manually set by the fleet owner using the remote controller 114 (via the server 116). This time period may also be automatically calculated by the central controller 101. This time period may vary from system to system due to the communication lags between the central controller 101 and the chargers 105. Exemplary magnitudes for the time period may include, but are not limited to, thirty (30.0) seconds, sixty (60.0) seconds, ninety seconds (90.0) seconds, one-hundred twenty (120.0) seconds, 3.0 minutes, 5.0 minutes, etc.

The small, medium, and large deltas for the CIV can be manually set by the fleet owner using the remote controller 114 (via the server 116). These deltas are associated with the increments of change for the CIV that are needed for the central controller 101 to react to changes in the system 200. For example, when numerous EVs 102 leave chargers 105 simultaneously or close to the same departure/disconnect time AND suppose the central controller 101 has been programmed to keep the electrical load of the charging facility/system 200 at a relatively constant demand relative to the utility provider 111, then the central controller 101 in this scenario would need to increase the Charge intensity value (CIV) pretty quickly in order to supply the remaining EVs 102 with more electrical power to make up for the loss in electrical load when EVs 102 have left the charging facility 200.

Exemplary values for the small, medium, and large deltas for the CIV are as follows: for the small delta, this value may be set to the value of 1.0. For the medium delta, this value may be set to the number of charge levels (NumCrgLvls) supported by each charger 105. And for the large delta, this value may be set equal to 10.0.

However, other values for these deltas are possible and are included within the scope of this disclosure. Further, additional deltas may be used beyond just the three described. That is, additional deltas may be supplied beyond the small, medium, and large deltas discussed above. This means four, five, six, and N deltas may be employed without departing from the scope of this disclosure. Additional deltas may allow the central controller 101 to take larger jumps/changes for the CIV in order to address large exoduses and/or large connections of EVs 102 which may leave and/or enter the charging facility 200 so that the central controller 101 may try to achieve a constant electrical load as perceived by the utility provider 111.

Referring again to FIG. 5, after receiving the deltas and time period for refreshing the CIV, next, in subroutine or submethod 510, the central controller 101 may then determine the minimum and maximum for CIV, referred to as CIVMin and CIVMax. Further details of subroutine 510 will be described below in connection with FIG. 6. The Charge intensity value (CIV) is dependent on the number of EVs 102 connected to the system 200 at any given instance of time. Further, the CIV is also dependent on the EV charging strategy for the facility 200 selected by the fleet owner with the remote controller 114 (via the server 116). And the CIV is also dependent on the charge priority index (CpIndex) for each charger 105 which can be manually set or automatically set by the system 200.

Next, in subroutine or submethod 515 the central controller 101 may determine increment values Increment Values (ILN, IMN, ISN) and Decrement Values (DLN, DMN, DSN) that are used by controller 101 to scale how much CIV must change based on present power consumption by the facility 200. The present power consumption of the facility 200 is impacted by the present number of vehicles connected and power consumption strategy selected by fleet owner using the remote controller 214.

Subsequently, in step 520, the central controller 101 may calculate a range for the CIV. The range may be set equal to CIVMax minus CIVMin. Next, in step 525, an internal increase variable (Inc) may be determined by the central controller, where Inc: is set equal to the sum of: (ILN×LargeDelta)+(IMN×MediumDelta)+(ISN×SmallDelta). The values ILN, IMN, and ISN were calculated in subroutine 515, while the LargeDelta, MediumDelta, and SmallDelta values were received in step 505 described above.

Next, in decision step 530, the central controller determines if the sum of (CIV+Inc) is greater than the CIVMax value. If the inquiry to decision step 530 is negative, meaning that the sum is less than or equal to CIVMax, then the "No" branch is followed to step 540. If the inquiry to decision step 530 is positive, meaning that the sum is greater than CIVMax, then the "Yes" branch is followed to step 535. In step 535, the central controller 101 sets the Inc value=CIV minus (−) the CIVMax value.

In step 540, the central controller 101 sets an internal Decrease Variable (Dec) equal to (=) the sum of: (DLN×LargeDelta)+(DMN×Medium Delta)+(DSN×SmallDelta). The values DLN, DMN, and DSN were calculated in subroutine 515, while the LargeDelta, MediumDelta, and SmallDelta values were received in step 505 described above.

Subsequently, in decision step 545, the central controller 101 determines if CIV minus (−) Dec is less than (<) the CIVMin value. If the inquiry to decision step 545 is negative, meaning that the subtraction is greater than or equal to the CIVMin value, then the "No" branch is followed to decision step 555. If the inquiry to decision step 545 is positive, meaning that the subtraction is less than the CIVMin value, then the "Yes" branch is followed to step 550.

In step 550, the central controller sets the Decrease variable (Dec) equal (=) to CIV minus (−) CIVMin. The subroutine 230 continues to decision step 555.

In decision step 555, the central controller determines if the decrease jumbo Boolean (DJB) variable is true. The decrease jumbo Boolean is the "shut-off" command, which shuts-off or completely shuts down any charging being made by the central controller 101. This DJB variable may be used to power off the entire charging facility 200 in response to an emergency and/or a command from a utility provider 111. If the inquiry to decision step 555 is negative, meaning that the DJB variable is not true and the charging facility 200 should continue charging, then the "No" branch is followed to step 565. If the inquiry to decision step 555 is positive, meaning that the entire charging facility 200 should shutdown, then the "Yes" branch is followed to step 560. In step 560, the central controller 101 sets the Dec variable equal (=) to the subtraction of CIV minus (−) CIVMin. The subroutine 230 continues to step 565.

In step 565, the central controller sets an internal variable DeltaCIV value equal (=) to the Inc value minus (−) the Dec value. Subsequently, in step 570, the central controller 101 sets the CIV value equal (=) to the sum of CIV+the Delta-CIV value (from Step 565). The subroutine or submethod 230 returns to step 235 of FIG. 2C.

Referring now to FIG. 6, this figure illustrates a logical flow chart for the submethod or subroutine 510 of FIG. 5 in which the central controller determines the Charge intensity value (CIV) minimum (CIVMin) and maximum (CIVMax) values discussed above in connection with FIG. 5. Step 605 is the first step of submethod or subroutine 510.

In step 605, the central controller 101 may periodically query the charge priority of each charger 105. As discussed previously, the fleet owner using remote controller 114 (via the server 116) may set the charge priority for each charger 105 and/or an operator of an EV 102 may also set the charge priority for a charger 105 as it is connected to a vehicle. Additionally, the central controller 101 may also automatically set the charge priority for each charger 105 as an EV 102 is connected to a charger 105.

Next, in subroutine or submethod 610, the central controller 101 may set a Minimum Charge Priority (ArMin) to a lowest latched ChargePriority and set a Maximum Charge Priority (ArMax) to the highest latched ChargePriority periodically or when a ConnectedCount changes. Subroutine 610 will be described in further detail below in connection with FIG. 7.

Subsequently, in step 615, the central controller 101 may set the CIVMin value equal to zero. And in step 620, the central controller may set the CIVMax value equal to: (ArMax)×(times) the NumChrgLvls. The subroutine 510 then returns to step 515 of FIG. 5.

Referring now to FIG. 7, this figure illustrates a logical flow chart for the submethod or subroutine 610 of FIG. 6 in which the central controller 101 determines minimum and maximum ChargePriorities for the system 200. Subroutine or submethod 705 is the first step of subroutine 610. In subroutine 705, the central controller 101 creates and populates an array that includes the Charge priority index (CpIndex) from the chargers 105 that are recently connected to the EVs 102. Further details of subroutine 705 will be described below in connection with FIG. 8.

After subroutine 705, next in step 710, the central controller 101 may Determine the CpIndex Override (if any) for each charger 105 and apply the override value to the array calculated in subroutine 705. Subsequently, in step 715, the resulting array is ranked and sorted by central controller 101 to provide the ArMin and ArMax values. Subsequently, in step 720, the subroutine 610 returns these two values for step 615 of FIG. 6.

Figure 8:
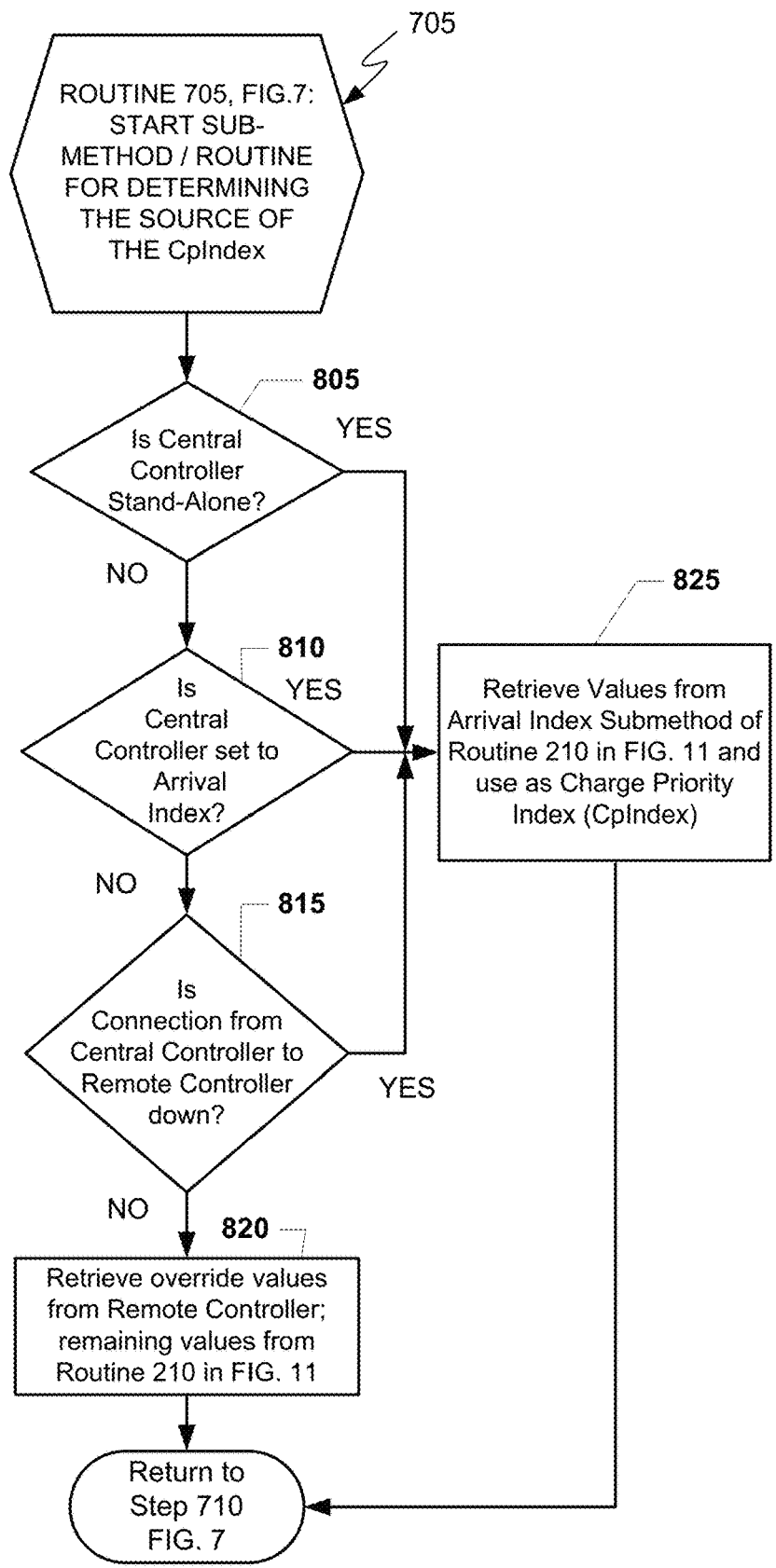
FIG. 8 illustrates a logical flow chart for the submethod or routine 705 of FIG. 7 in which the central controller generates and populates an array that includes CpIndex from chargers that are recently connected to electric vehicles (EVs)

Referring now to FIG. 8, this figure illustrates a logical flow chart for the submethod or subroutine 705 of FIG. 7 in which the central controller 101 generates and populates an array that includes CpIndex from chargers 105 that are recently connected to electric vehicles (EVs) 102.

The CpIndex is an array of integer values that the central controller 101 uses to assign the charge priority for each charger 105 and which is used in subroutine/submethod 610 described above. The source of the CpIndex is determined by the central controller 101 by considering one or more factors, such as: i) if the central controller 101 is operating as a stand-alone unit or is it coupled to the remote controller 114 (via the server 116) [decision step 805], or ii) has the fleet owner provided a source for the CpIndex [decision step 810]. In stand-alone operation for a charger 105, the only source is the Arrival Index (Subroutine/Submethod 825).

If the central controller 101 is coupled with the remote controller 114 (via the server 116), a fleet owner may set-up the Arrival Index (Subroutine/Submethod 825), or a 7DayAverageChargeKwh, or a 7DayAverageChargeHours, or a 7DayAverageDepartureTime, or an External Predictive Analysis, and/or based on manual user input through a graphical user interface (GUI) included with the remote controller 114 (via the server 116). Decision Step 805 is the first step of subroutine 705. In decision step 805, the central controller 101 determines if it is connected to remote controller 114 (via the server 116) or if it is operating as a stand-alone unit. If the inquiry to decision step 805 is negative, then the "No" branch is followed to decision step 810. If the inquiry to decision step is positive, meaning that the central controller 101 is a stand-alone unit, then the "Yes" branch is followed to subroutine/submethod 825 in which an arrival index subroutine is executed by the central controller 101.

Next, in decision step 810, the central controller 101 determines if it is set to use the arrival index subroutine/submethod 825. If the inquiry to decision step 810 is negative, then the "No" branch is followed to decision step 815. If the inquiry to decision step 810 is positive, then the "Yes" branch is followed to subroutine/submethod 825.

Next, in decision step 815, the central controller 101 determines if its communication link 107f with the remote controller 114 (via the server 116 and/or the Internet 103) is down. If the inquiry to decision step 815 is positive, then the "Yes" branch is followed to step 820. If the inquiry to decision step 815 is negative, then the "No" branch is followed to subroutine/submethod 825.

In step 825, the central controller 101 the central controller 101 may retrieve values from the Arrival Index Submethod of Routine 210 illustrated in FIG. 11 (described below) and use them as the Charge Priority Index (CpIndex).

In step 820, the central controller 101 retrieves any override values for the CpIndex for particular chargers 105 from the remote controller 114 which may be stored at the central server 116. For example, see GUI 1400 of FIG. 14, and particularly, the Charger control settings 1408. Specifically, see the "Manger Override" setting which can be changed to "ON" instead of "OFF" as shown in FIG. 14. Turning the Manger Override setting to "ON" and then providing a value, like "1" under "Charge Priority" in 1408 instead of "EVauto" would be the value used by the central controller 101 for the charge priority of this charger 105 (designated as "EV_03" in GUI 1400 of FIG. 14).

FIG. 8 is but one example that demonstrates how the central controller 101 is directly coupled to each electric vehicle charger 105 of the electric vehicle fleet 102 and which does not communicate with each electrical vehicle charger 105 over the Internet or via any vehicle telematics: but instead, the inventive system and method 200 relies on a direct communication link 107 with each electric vehicle charger 105. The system 200 may function even when the Internet 103 is down or communication links 107 to the Internet 103 are down, and/or when communications with the remote controller 114 are not possible.

Figure 11:
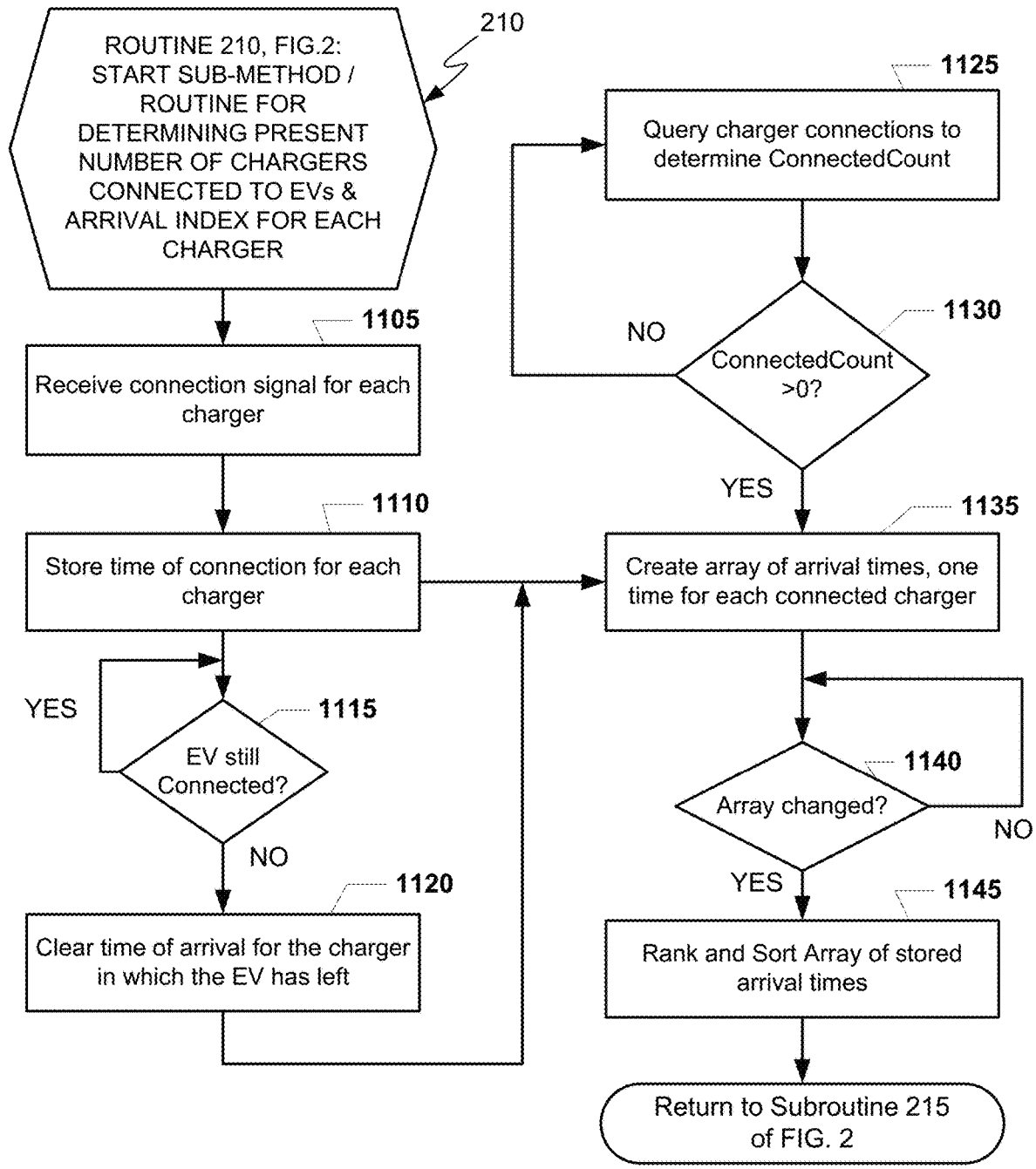
FIG. 11 illustrates a logical flow chart for the submethod or subroutine 210 of FIG. 2C in which the central controller may determine the present number of chargers connected to EVs and the arrival index assigned to each charger.

Also in step 820, if a charger 105 does not have an override value, the central controller 101 may get those remaining values from routine 210 in FIG. 11. After steps 820 and 825, the subroutine/submethod 705 returns to step 710 of FIG. 7.

Figure 9:
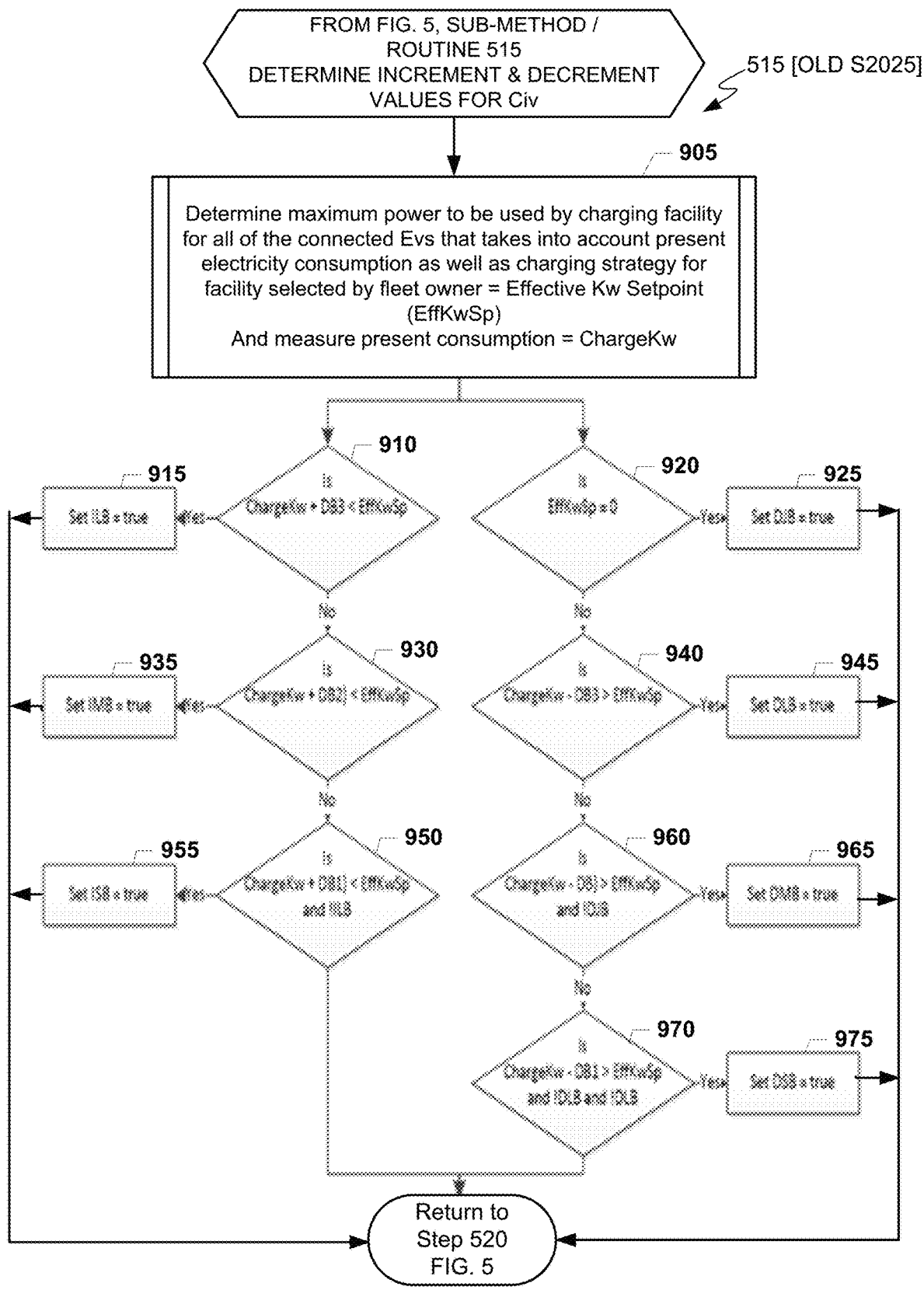
FIG. 9 illustrates a logical flow chart for the submethod or subroutine 515 of FIG. 5 in which the central controller determines Increment Values (ILN, IMN, ISN) and decrement Values (DLN, DMN, DSN, DSB) for changing the Charge intensity value (CIV)

Referring now to FIG. 9, this figure illustrates a logical flow chart for the submethod or subroutine 515 of FIG. 5 in which the central controller 101 determines Increment Values (ILN, IMN, ISN) and decrement Values (DLN, DMN, DSN) that are used by the central controller 101. The central controller uses these Increment and Decrement values to scale how much the Charge intensity value (CIV) must change based on present electrical energy consumption by the facility/system 200 that is impacted by present number of electric vehicles (EVs) 102 connected and power consumption strategy selected by fleet owner via the remote controller 114 (via the server 116).

Subroutine/submethod 905 is the first step of Subroutine/submethod 515. In Subroutine 905, the central controller 101 may determine the maximum power to be used by the charging facility/system 200 for all of the connected EVs 102 that takes into account the total present electricity consumption for all connected electrical consuming devices for the facility selected by fleet owner. This maximum power is set equal (=) to a variable called the Effective Kw Setpoint (EffKwSp). This EffKwSp variable is used in several decision steps of FIG. 9. Calculation of EffKwSp will be described below in connection with FIG. 10. Also determined in subroutine 905 is the variable ChargeKw which is the present power consumption level read by the electric meter 110 of FIG. 1.

After Subroutine/submethod 905, the subroutine/submethod 515 continues on to both decision steps 910 and 920. That is, decision steps 910 and 920, as well as decision steps 930, 940, 950, 960, and 970 may be executed in parallel with one another as illustrated in FIG. 9 and as understood by one of ordinary skill in the art.

In decision step 910, the central controller 101 determines if the present electrical power consumption (ChargeKw) plus (+) a third deadband constant (DB3 is less than (<) the effective Kw Setpoint (EffKwSp) calculated in subroutine 905. The fleet owner may provide at least three deadband (DB) constants.

A deadband (DB) constant is a value in the domain of a transfer function for a control system or signal processing system 200 where the output is zero (the output is 'dead'— no action occurs within the system 200). The central controller 101 may provide a user interface with display device where the fleet owner, via the remote controller 114 (via the server 116), may select/choose suggested deadband values (DBs). In the exemplary embodiment of FIG. 9, three deadband (DB) values are described (DB1, DB2, & DB3). However, fewer or a greater number of deadband values (DBs) could be employed without departing from the scope of this disclosure as understood by one of ordinary skill in the art.

If the inquiry to decision step 910 is negative, meaning that the present electrical power consumption (ChargeKw) plus (+) a third deadband constant (DB3 is greater than (<) or equal to (=) the effective Kw Setpoint (EffKwSp), then the "No" branch is followed to decision step 930. If the inquiry to decision step 910 is positive, meaning that the present electrical power consumption (ChargeKw) plus (+) a third deadband constant (DB3 is less than (<) the effective Kw Setpoint (EffKwSp), then the "Yes" branch is followed to step 915.

In step 915, the variable Increment Low Boolean (ILB) is set equal to "True." The variable ILB is used to increase the Charge intensity value (CIV) as described above in connection with FIG. 5. The variable ILB is converted to an Increment Large Numeric (ILN) variable (in FIG. 5) which is a number, usually an integer, as explained above in connection with FIG. 5. From step 915, the submethod/sub-routine 515 returns to step 520 of FIG. 5.

In decision step 930, the central controller 101 determines if the present electrical power consumption (ChargeKw) plus (+) a second deadband constant (DB2 is less than (<) the effective Kw Setpoint (EffKwSp) calculated in subroutine 905. If the inquiry to decision step 930 is negative, meaning that the present electrical power consumption (ChargeKw) plus (+) a second deadband constant (DB2 is greater than (<) or equal to (=) the effective Kw Setpoint (EffKwSp), then the "No" branch is followed to decision step 935.

If the inquiry to decision step 930 is positive, meaning that the present electrical power consumption (ChargeKw) plus (+) the second deadband constant (DB2 is less than (<) the effective Kw Setpoint (EffKwSp), then the "Yes" branch is followed to step 935.

In step 935, the variable Increment Medium Boolean (IMB) is set equal to "True." The variable IMB is used to increase the Charge intensity value (CIV) as described above in connection with FIG. 5. The variable IMB is converted to an Increment Medium Numeric (IMN) variable (in FIG. 5) which is a number, usually an integer, as explained above in connection with FIG. 5. From step 935, the submethod/sub-routine 515 returns to step 520 of FIG. 5.

In decision step 950, the central controller 101 determines if the present electrical power consumption (ChargeKw) plus (+) a first deadband constant (DB1 is less than (<) the effective Kw Setpoint (EffKwSp) calculated in subroutine 905. If the inquiry to decision step 950 is negative, meaning that the present electrical power consumption (ChargeKw) plus (+) a first deadband constant (DB1 is greater than (<) or equal to (=) the effective Kw Setpoint (EffKwSp), then the "No" branch is followed back to Step 520 of FIG. 5.

If the inquiry to decision step 950 is positive, meaning that the present electrical power consumption (ChargeKw) plus (+) the first deadband constant (DB1 is less than (<) the effective Kw Setpoint (EffKwSp), then the "Yes" branch is followed to step 955. In step 955, the variable Increment Small Boolean (ISB) is set equal to "True." The variable ISB is used to increase the Charge intensity value (CIV) as described above in connection with FIG. 5. The variable ISB is converted to an Increment Small Numeric (ISN) variable (in FIG. 5) which is a number, usually an integer, as explained above in connection with FIG. 5. From step 955, the submethod/sub-routine 515 returns to step 520 of FIG. 5.

In decision step 920, the central controller 101 determines if the effective Kw Setpoint (EffKwSp) calculated in subroutine 905 has been set equal (=) to zero, which means that the fleet owner and/or the utility provider 111 has decided to shut down/shut-off the charging facility/system 200. If the inquiry to decision step 920 is positive, meaning that the fleet owner via the remote controller 114 (via the server 116) and/or control signals from the utility provider 111 want to shut-off/shut-down the charging facility/system 200, then the "Yes" branch is followed to step 925.

In step 925, the variable Decrement Jumbo Boolean (DJB) is set equal (=) to true. Later, in connection with FIG.

5, this variable DJB is converted to a Decrement Jumbo Numeric (DJN) value which typically is an integer. The submethod/subroutine 515 then returns to step 520 of FIG. 5. If the inquiry to decision step 920 is negative, meaning that the charging facility/system 200 should continue charging its EV fleet 102, then the "No" branch is followed to step 940.

In decision step 940, the central controller 101 determines if the present electrical power consumption (ChargeKw) minus (−) the third deadband constant (DB3 is greater than (>) the effective Kw Setpoint (EffKwSp) calculated in subroutine 905. If the inquiry to decision step 940 is negative, meaning that the present electrical power consumption (ChargeKw) minus (−) the third deadband constant (DB3) is less than (<) or equal to (=) the effective Kw Setpoint (EffKwSp), then the "No" branch is followed to decision Step 960.

If the inquiry to decision step 940 is positive, meaning that the present electrical power consumption (ChargeKw) minus (−) the third deadband constant (DB3 is greater than (>) the effective Kw Setpoint (EffKwSp), then the "Yes" branch is followed to step 945. In step 945, the variable Decrement Large Boolean (DLB) is set equal to "True." The variable DLB is used to decrease the Charge intensity value (CIV) as described above in connection with FIG. 5. The variable DLB is converted to a Decrement Large Numeric (DLN) variable (in FIG. 5) which is a number, usually an integer, as explained above in connection with FIG. 5. From step 945, the submethod/sub-routine 515 returns to step 520 of FIG. 5.

In decision step 960, the central controller 101 determines if the present electrical power consumption (ChargeKw) minus (−) the second deadband constant (DB2 is greater than (>) the effective Kw Setpoint (EffKwSp) calculated in subroutine 905. If the inquiry to decision step 960 is negative, meaning that the present electrical power consumption (ChargeKw) minus (−) the second deadband constant (DB2) is less than (<) or equal to (=) the effective Kw Setpoint (EffKwSp), then the "No" branch is followed to decision Step 970.

If the inquiry to decision step 960 is positive, meaning that the present electrical power consumption (ChargeKw) minus (−) the second deadband constant (DB2 is greater than (>) the effective Kw Setpoint (EffKwSp), then the "Yes" branch is followed to step 965. In step 965, the variable Decrement Medium Boolean (DMB) is set equal to "True." The variable DMB is used to decrease the Charge intensity value (CIV) as described above in connection with FIG. 5. The variable DMB is converted to a Decrement Medium Numeric (DMN) variable (in FIG. 5) which is a number, usually an integer, as explained above in connection with FIG. 5. From step 965, the submethod/sub-routine 515 returns to step 520 of FIG. 5.

In decision step 970, the central controller 101 determines if the present electrical power consumption (ChargeKw) minus (−) the first deadband constant (DB1 is greater than (>) the effective Kw Setpoint (EffKwSp) calculated in subroutine 905. If the inquiry to decision step 970 is negative, meaning that the present electrical power consumption (ChargeKw) minus (−) the first deadband constant (DB1) is less than (<) or equal to (=) the effective Kw Setpoint (EffKwSp), then the "No" branch is followed back to step 520 of FIG. 5.

If the inquiry to decision step 970 is positive, meaning that the present electrical power consumption (ChargeKw) minus (−) the first deadband constant (DB1 is greater than (>) the effective Kw Setpoint (EffKwSp), then the "Yes" branch is followed to step 975. In step 975, the variable Decrement Small Boolean (DSB) is set equal to "True." The variable DSB is used to decrease the Charge intensity value (CIV) as described above in connection with FIG. 5. The variable DSB is converted to a Decrement Small Numeric (DSN) variable (in FIG. 5) which is a number, usually an integer, as explained above in connection with FIG. 5. From step 975, the submethod/sub-routine 515 returns to step 520 of FIG. 5.

Figure 10:
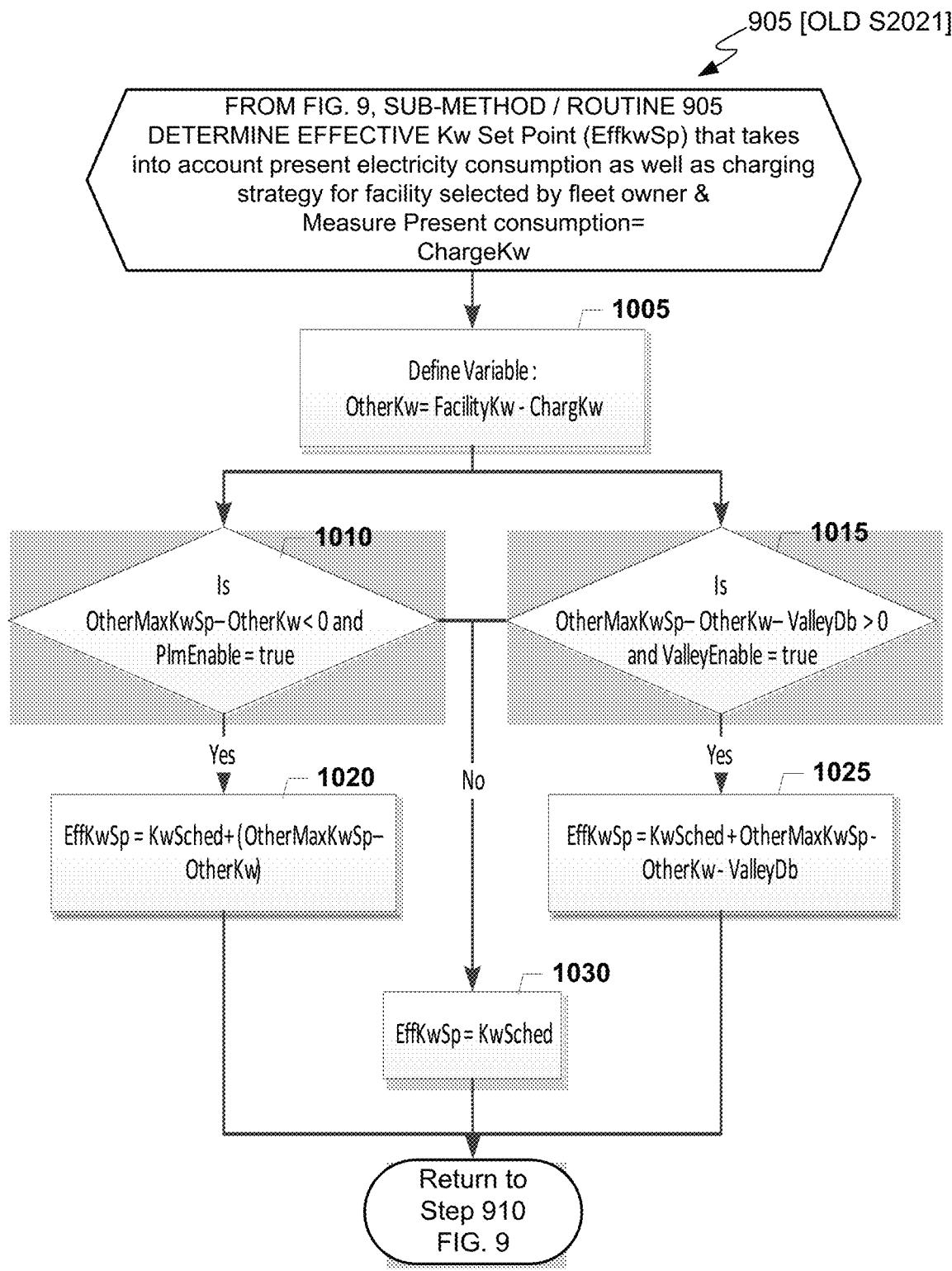
FIG. 10 illustrates a logical flow chart for the submethod or subroutine 905 of FIG. 9 in which the central controller may determine the maximum power to be used by the charging facility/system for all of the connected EVs, and that takes into account present electricity consumption as well as charging strategy for facility selected by fleet owner.

Referring now to FIG. 10, this figure illustrates a logical flow chart for the submethod or subroutine 905 of FIG. 9 in which the central controller 101 may determine the maximum power to be used by the charging facility/system 200 for all of the connected EVs, and that takes into account present electricity consumption as well as charging strategy for facility 200 selected by fleet owner. Also determined in subroutine 905 is the variable ChargeKw which is the present power consumption level read by the facility electric main meter 110(i) of FIG. 1.

It is noted that "OtherKw" is power usage for equipment outside of the EV fleet 102. This "OtherKw" may be measured by an optional second electric meter 110(ii). The logic in FIG. 12 is generally intended to use EV charging to offset variations in power consumption in OtherKw to deliver more normalized power usage for the entire facility 200.

For installations of the central controller 101 where there is not a second meter 110(ii) installed to monitor power consumed for non-EV charging at location/facility 200 by other equipment, in step 1005, the central controller 101 defines a "OtherKw" variable. The OtherKw variable is the difference between the Output from Facility Main Meter 110(i) (FacilityKw) and present electrical power consumption (ChargeKw) by all chargers 105 tracked by the central controller 101. In other words, three values are needed to complete the calculations of FIG. 10.

Two values are measured while one is calculated. The three values are the total power used measured at the main utility connection ("FacilityKw") via 110(i) (in the instance/scenario where a second meter 100(ii) for other equipment is not present), the power used for EV charging ("ChargeKw") tracked by the central controller 105, and everything else in the facility ("OtherKw"). [FacilityKw=ChargeKw+OtherKw]

Next, decision steps 1010 and 1015 and their outputs may be performed in parallel as understood by one of ordinary skill in the art. The fleet owner using the remote controller 114 (via the server 116) may provide one or more of the following parameters to the central controller 101 for determining the EffKwSp. The Fleet Owner may specify a value for a maximum amount of non-EV power usage for their facility 200=OtherMaxKwSp. OtherMaxKwSp may be set equal to a deadband constant ValleyDb, and the Fleet Owner may provide a setting to enable or disable the functionality described in Routine 905.

In decision step 1010, the central controller 101 determines if the desired maximum kW setpoint for the facility 200 EV charging should be reduced or disabled to offset an increase in OtherKw above the OtherMaxKwSp. If in decision step 1010 (OtherMaxKwSp) minus (−) the OtherKw variable is less than (<) zero and if the "On/Off" switch for peak load management functionality (PlmEnable) is set (=) to true. If the inquiry to decision step 1010 is positive, then the "Yes" branch is followed to step 1020. If the inquiry to decision step 1010 is negative, then the "No" branch is followed to step 1030.

In step 1020, the central controller sets the effective Kw Setpoint (EffKwSp) equal (=) to a charging Kw from a numeric schedule object plus (+) the OtherMaxKwSp minus (−) the OtherKw variable. The intent of step 1020 is to deliver the ability to avoid setting an electric demand peak for FacilityKw caused by a demand peak in OtherKw. That is, the purpose of step 1020 is to decrease EV charging by the amount that OtherKw exceeds its setpoint. The submethod 905 then returns to step 910 of FIG. 9.

In step 1030, the central controller 101 sets the effective Kw Setpoint (EffKwSp) equal (=) to the maximum charging Kw from a numeric schedule object. In step 1030, the OtherKw usage isn't too high or low and the system 200 may use the scheduled kW setpoint.

Meanwhile, in decision step 1015, performed in parallel with decision step 1010, the central controller 101 determines if the desired maximum kW setpoint for the facility 200 excluding EV charging is increased. If in decision step 1015 (OtherMaxKwSp) minus (−) the OtherKw variable AND minus (−) Deadband before valley fill is enabled (ValleyDb) is greater than (>) zero and if the "On/Off" switch for valley fill functionality is set (=) to true. If the inquiry to decision step 1015 is positive, then the "Yes" branch is followed to step 1025. If the inquiry to decision step 1015 is negative, then the "No" branch is followed to step 1030.

In step 1025, the central controller sets the effective Kw Setpoint (EffKwSp) equal (=) to a charging Kw from a numeric schedule object plus (+) the OtherMaxKwSp minus (−) the ValleyDb variable. The situation for step 1025 is the opposite to that of step 1020. An energy manager may have contracted to purchase a minimum amount of power. If OtherKw is below the setpoint plus a deadband, then step 1020 may increase the Effective setpoint above the scheduled setpoint. The submethod 905 then returns to step 910 of FIG. 9.

Referring now to FIG. 11, this figure illustrates a logical flow chart for the submethod or subroutine 210 of FIG. 2C in which the central controller 101 may determine the present number of chargers 105 connected to EVs 102 and the arrival index assigned to each charger 105 (based on when an EV 102 is connected). Step 1105 is the first step of submethod/subroutine 210 in which the central controller 101 may receive a connection signal from each charger 105 when an EV 102 is coupled to the charger 105.

In step 1105, the central controller 101 may assign registers for each charger 105 within the EV fleet 102. For example, the central controller 101 may assign two registers for each EV 102. A first register may record that a connection signal has been received from a charger 105. A second register may store the time of day at which the EV 102 was connected to a charger 105. In step 1105, when a connection signal is received from a charger 105, it may store this result in the first register for that particular charger 105.

Next, in step 1110, the central controller 101 may store the arrival time or time at which the EV 102 couples to a particular charger 105 in the second register. Each EV 102 may be coupled to a particular charger 105 manually and/or automatically. That is, a human operator may couple an EV 102 to a charger 105 and/or the human operator may receive assistance with the physical connection by robotics and/or other automated means for coupling an EV 102 to a charger 105. The coupling between an EV 102 and a charger 105 may be a contactless one, such as thru an inductive coupling or through radio-frequency (RF) power transmission or a robotic process. Any number and/or a combination of coupling methods may be employed without departing from the scope of this disclosure.

After step 1110, the central controller 101 may perform/execute decision step 1115 and step 1135 in parallel with one another as understood by one of ordinary skill in the art. In decision step 1115, the central controller 101 may determine if each charger 105 that had registered an EV connection still has a connection with its EV 102. If the inquiry to decision step 1115 is positive, then the "Yes" branch is followed back so that this checking by the central controller 101 continues in a loop. If the inquiry to decision step 1115 is negative, then the "No" branch is followed to step 1120.

In step 1120, the central controller 101 clears the arrival time in the array assigned to the charger 105 in which the EV 102 has left. The submethod then continues to step 1130.

In step 1135, the central controller 101 creates an array in memory for the arrival times of day for each EV 102 that is coupled to a charger 105 and needing a charge. Each charger 105 is assigned a time entry in this array.

Prior to step 1135, the central controller 101 may perform/execute steps 1125 and 1130. In step 1125, the central controller may query charger connections to determine a ConnectedCount that indicates a present number of chargers 105 having EVs 102 needing a charge. Next, in decision step 1130, the central controller may determine if the ConnectedCount is greater than (>) zero. If the inquiry to decision step 1130 is negative, then the "No" branch is followed back to step 1125. If the inquiry to decision step 1130 is positive, then the "Yes" branch is followed to step 1135.

After step 1135 in which the array of arrival times for EVs 102 is created, in decision step 1140, the central controller 101 determines if the array has changed. If the inquiry to decision step 1140 is negative, then the "No" branch is followed in which decision step 1140 is repeated in a loop as understood by one of ordinary skill in the art. If the inquiry to decision step 1140 is positive, then the "Yes" branch is followed to step 1145.

In step 1145, the central controller 101 ranks and sorts the array chronologically based on the EV arrival times present within the array. The submethod 210 then returns to subroutine 215 of FIG. 2C.

Referring now to FIG. 12A, this figure which illustrates an exemplary graphical user interface display 1200A (displayable on display devices 1947 of FIGS. 19-20) for the remote controller 114 (via the server 116) that lists exemplary daily charge values 1202 for a single charger 105 according to an exemplary embodiment. While these daily charge values 1202 are provided in kW-hours, other units are possible and are within the scope of this disclosure. Display 1200A (and all displays described herein) may be rendered by the display device 1947 of the remote controller 214 and/or or by the display device 1947 of the central controller 101.

Throughout the several GUIs illustrated in FIGS. 12-18, the trademark or brand EV AUTO™ is displayed. This is one brand for the central controller 101 as of this writing.

The meters 110a-n located at respective chargers 105 may allow the central controller 101 to track this metric and relay this information over the communications network 103 to the remote controller 114 (via the server 116). The daily charge values 1202 are calculated in routine 161 of FIG. 2B as described above. And as noted previously, the daily charge values 1202 may be used by the remote controller 114 (via the server 116) to automatically determine the Charge priority index (CpIndex) for each charger 105.

Referring now FIG. 12B, this figure illustrates an exemplary graphical user interface display 1200B (displayable on display devices 1947 of FIGS. 19-20) for the remote controller 114 (via the server 116) that lists exemplary charge durations 1204 for a single charger 105 according to an exemplary embodiment. In this embodiment, the durations 1204 are listed in hours, however, other units/time increments are possible and are included within the scope of this disclosure. The meters 110a-n located at respective chargers 105 may allow the central controller 101 to track this metric and relay this information over the communications network 103 to the remote controller 114 (via the server 116).

The daily charge durations 1204 are calculated in routine 161 of FIG. 2B as described above. And as noted previously, the daily charge durations 1204 may be used by the remote controller 114 (via the server 116) to automatically determine the Charge priority index (CpIndex) for each charger 105.

Referring now to FIG. 12C, this figure illustrates an exemplary graphical user interface display 1200C (displayable on display devices 1947 of FIGS. 19-20) for the remote controller 114 (via the server 116) that lists exemplary departure times 1206 for a single charger 105 according to an exemplary embodiment. As noted previously, the departure times 1206 may be used by the remote controller 114 (via the server 116) to automatically determine the Charge priority index (CpIndex) for each charger 105.

Figure 12D:
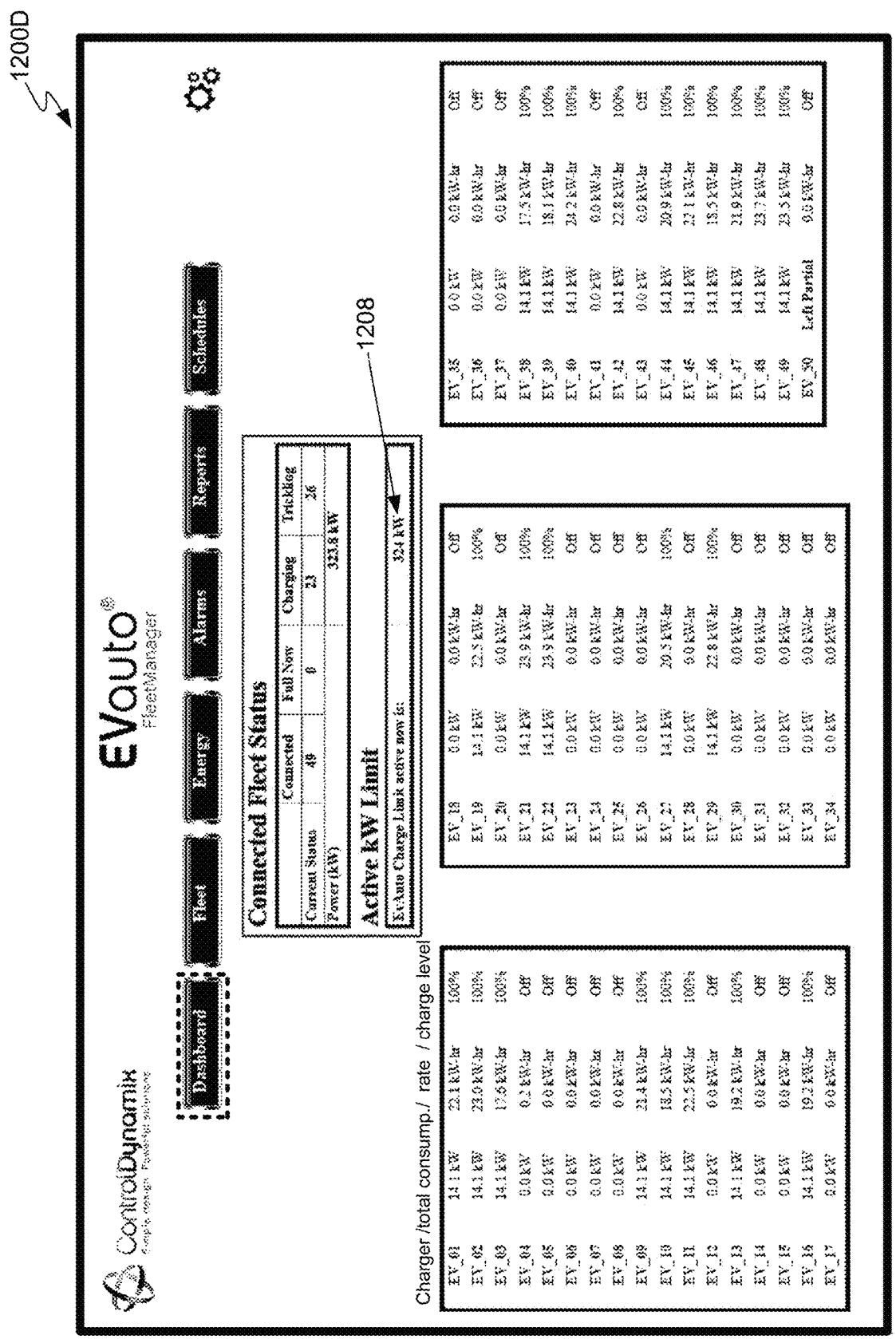
FIG. 12D illustrates an exemplary graphical user interface display (displayable on display devices of FIGS. 19-20) for the remote controller that lists a "Dashboard" page which provides a summary status data for all chargers in the system.

Referring now to FIG. 12D, this figure illustrates an exemplary graphical user interface (GUI) display 1200D (displayable on display devices 1947 of FIGS. 19-20) for the remote controller 114 that lists a "Dashboard" page (see highlighted "Dashboard" button on the page) which provides summary status data for all chargers 105. This GUI 1200D allows the EV fleet owner/operator to exercise an override control of the entire system 200 with respect to the effective Kw Set Point (EffkwSp) of submethod 905 of FIG. 10 that takes into account present electricity consumption as well as charging strategy for facility 200 selected by fleet owner.

The GUI 1200D may also allow the EV fleet owner/operator to override control of each charger 105. The GUI 1200D may also provide user navigation to other pages of data displayable on display device 1947 (i.e. "Fleet," "Energy," "Alarms," "Reports," "Schedules," "Settings," etc.).

The GUI 1200D may allow the EV fleet owner to set a charge level limit 1208 for each charger 105. According to this exemplary embodiment, the charge level limit is set to 324 kW. Other charge level limits higher or lower are possible and are included within the scope of this disclosure. The GUI 1200D may also display a charger number ("Charger") assigned to each charger 105, a total power consumption in kW ("total consump."), a rate per hour consumption ("rate"), and the present charge level ("charge level") for each charger 105. According to the exemplary embodiment shown in FIG. 12D, there were fifty (50) chargers 105.

Referring now to FIG. 13, this figure illustrates an exemplary graphical user interface (GUI) display 1300 (displayable on display devices 1947 of FIGS. 19-20) for the remote controller 114 that lists a Fleet page (see highlighted "Fleet" button on top of page) which provides additional summary status data for chargers 105. As noted previously, the GUI 1300 also allows the EV Fleet owner to manually enter and thus override a Charge priority index (CpIndex) 1302 assigned to each charger 105.

The GUI 1300 may display other information, including, but not limited to, Key Performance Indicators (KPIs), Charge tracking, Fleet Charge Control, and Power and Energy summaries. Similar to the GUI 1200C of FIG. 12C, GUI 1300 may also allow the EV fleet owner to adjust the charge level limit 108 that is set for each charger 105. The GUI 1300 may also provide graphs which display power consumption for each day for the charging facility 200.

Referring now to FIG. 14, this figure illustrates an exemplary graphical user interface (GUI) display 1400 (displayable on display devices 1947 of FIGS. 19-20) for the remote controller 114 that lists a Charger page which provides status information for a single charger 105. According to this exemplary embodiment, the status information for a charger 105 assigned with the identifier, "EV_03," is being displayed with GUI 1400.

GUI 1400 may display information such as, but not limited to, summary data 1402, charger trend analysis 1406, EV Charger control 1408, and a graph 1410.

The summary data 1402 may include: present power being consumed (in kW as well as amps); charging mode; connected vehicle state; effective charge intensity (in percentage); and any fault conditions. The charger control values 1404 may include: a manager override (if any), whether the represented Charger 105 is locked, maximum charge intensity, minimum charge intensity, any override of the automatically calculated Charge priority index (CpIndex) value for the represented Charger 105, and demand response (DR)—response level.

The charge-day metrics 1406 may include: arrival time; departure time, chart start time; charge end time; charge delay timer; charge day kWh; and calendar day kWh. The charge trend analysis may include: charging kW-hr; charging hours elapsed; tricking kW-hr; trickling hours; arrival time; and departure time. And the graph may display kW-hr consumed per calendar day.

Some of the settings that may be adjusted under the EV Charger Control 1408 of GUI 1400 may provide the override data requested in step 710 as described above. Specifically, the settings under 1408 allow the Fleet Owner to set (from left to right): a "Manager Override"—which may override all control settings including—any lockout settings that may be set under, "Lock per Schedule", Maximum Charge Limits, Minimum charge limits either whenever a charger 105 is connected or after charging starts, Automatically calculated CpIndex for this charger 105, and Authorized Demand Response settings.

Specifically, the "Lock per Schedule" setting allows for chargers 105 to be lockout out during certain times. The "Maximum Charge" setting may limit power to the charger 105 when operating without "Manager Override." The "Min Charge: Whenever Connected" setting may allow for establishing a minimum charge level for charger 105 whenever an EV 102 is connected when there is not a "Manager Override" in use. This setting may be useful for EVs 102 with parasitic loads (i.e. —refrigerated cargo) or as another way to modify the Focused Charging strategy.

The "Min Charge: After Charge Starts" setting allow a minimum charge level for a charger 105 whenever an EV 102 is connected after charging is authorized and starts when there is not an "Manager Override." The "Charge Priority" setting allows the Fleet Owner to override the CpIndex for this charger 105 as discussed in step 165 of FIG. 2B and step 710 of FIG. 7. The "Authorized DR Level" setting allows the override of a master setting for responding to a Utility Demand Response request for this charger 105.

Figure 15:
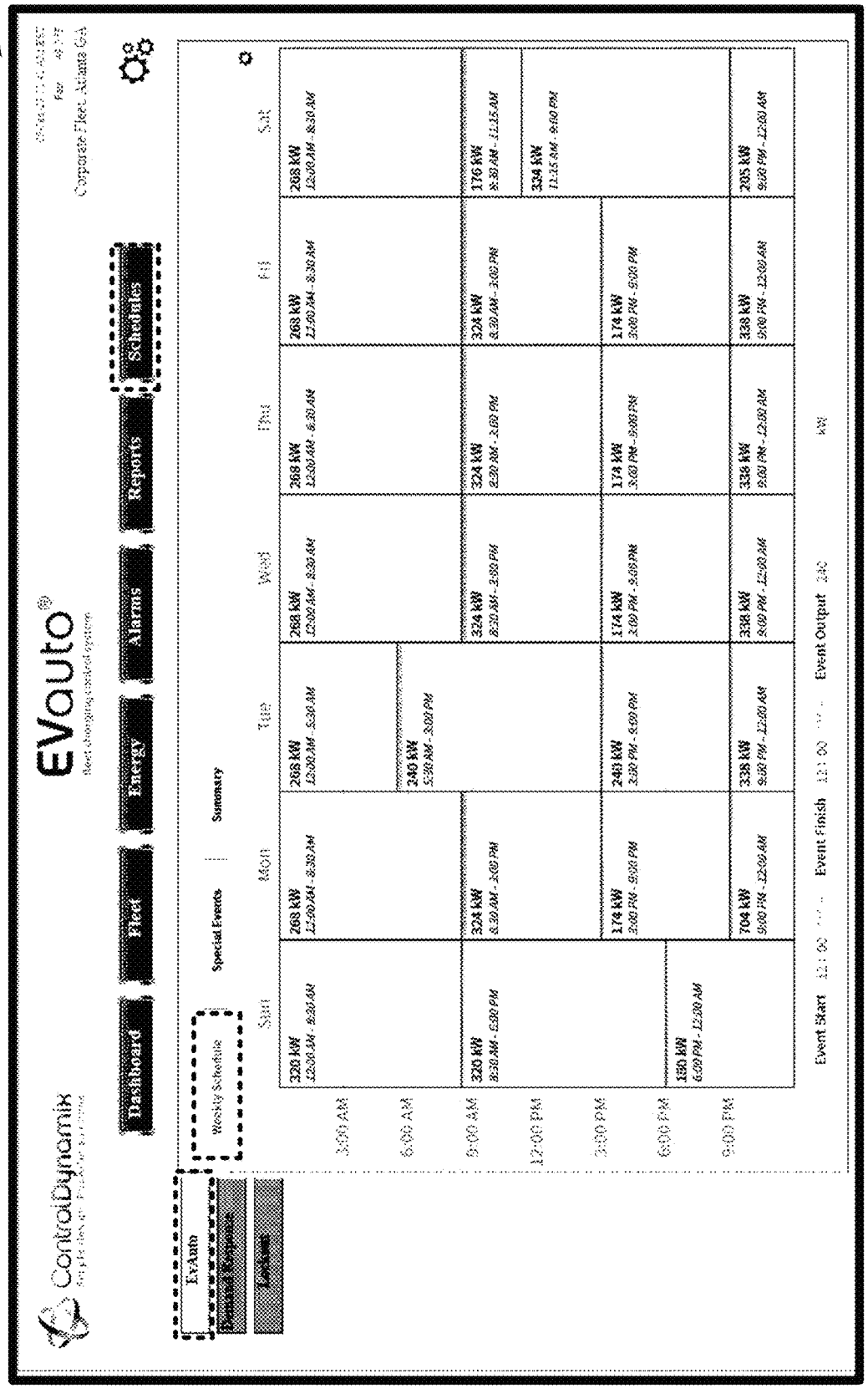
FIG. 15 illustrates an exemplary graphical user interface (GUI) display (displayable on display devices of FIGS. 19-20) for the remote controller that allows an EV fleet owner to set a schedule for the effective Kw Set Point.

Referring now to FIG. 15, this figure illustrates an exemplary graphical user interface (GUI) display 1500 (displayable on display devices 1947 of FIGS. 19-20) for the remote controller 114 that allows an EV fleet owner to set a schedule for the effective Kw Set Point. See highlighted "Scheduled" button on top of the page for GUI 1500 as well as the highlighted "Weekly Schedule" and "EV AUTO" buttons, which denote the active functions for this GUI.

This GUI 1500 corresponds to the "Schedule" button listed on the top of GUI 1500. This graphical scheduler of GUI 1500 is used by the EV fleet owner to set a schedule for effective Kw Set Point (KwSched) of submethod 905 of FIG. 10 that takes into account present electricity consumption as well as charging strategy for facility 200 selected by fleet owner. The GUI 1500 allows the EV fleet owner to set the KwSched Set Point for certain hours during each calendar day.

For example, for the day of Sunday listed in the exemplary embodiment of weekly schedule illustrated in FIG. 15, the EV fleet owner via the remote controller 114 set the hourly limit for the charging facility at 320 kW per hour between the hours of 12:00 AM and 8:30 AM. Between the hours of 8:30 AM and 6:00 PM, the EV fleet owner set the hourly limit at 180 kW per hour. Between the hours of 6:00 PM and 12:00 AM, the EV fleet owner set the hourly limit at 320 kW per hour. Other hourly limits higher or lower are possible and are included within the scope of this disclosure. Further, shorter or longer hourly ranges are possible and within the scope of this disclosure as understood by one of ordinary skill in the art.

Figure 16:
FIG. 16 illustrates an exemplary graphical user interface (GUI) display (displayable on display devices of FIGS. 19-20) for the remote controller that corresponds to the "Settings" button at the top of the page which allows for the input of settings for the central controller.

Referring now to FIG. 16, this figure illustrates an exemplary graphical user interface (GUI) display 1600 (displayable on display devices 1947 of FIGS. 19-20) for the remote controller 114 that corresponds to the highlighted "Settings" button and the highlighted "EVauto" button which allows for the input of settings 1602 for the central controller 101.

Exemplary settings 1602 which may be received from this GUI 1600 include, but are not limited to: one of the two charging strategies [Focused (FcFs) Or Semi-Level (Actev)—see decision step 235 of FIG. 2C]; charger prioritization (arrival order, departure order, etc.); facility peak-load-management (PLM) on or off; valley fill function on or off; minimum charge level when connected on or off; minimum charge level after charge starts; small deadband amount (in kW—See DB1 of FIG. 9); medium dead band amount (in kW—See DB2 of FIG. 9); large dead band amount (in kW—See DB3 of FIG. 9); a peak load set point in kW; Small Change Delta (in units of charge levels; see "SmallDelta" referenced in FIG. 5); Medium Change Delta (in units of chargers; see "MediumDelta" referenced in FIG. 5); and Large Change Delta (in units of chargers; see "LargeDelta" referenced in FIG. 5). Other settings for the central controller 1010 are possible and are included within the scope of this disclosure.

Figure 17:
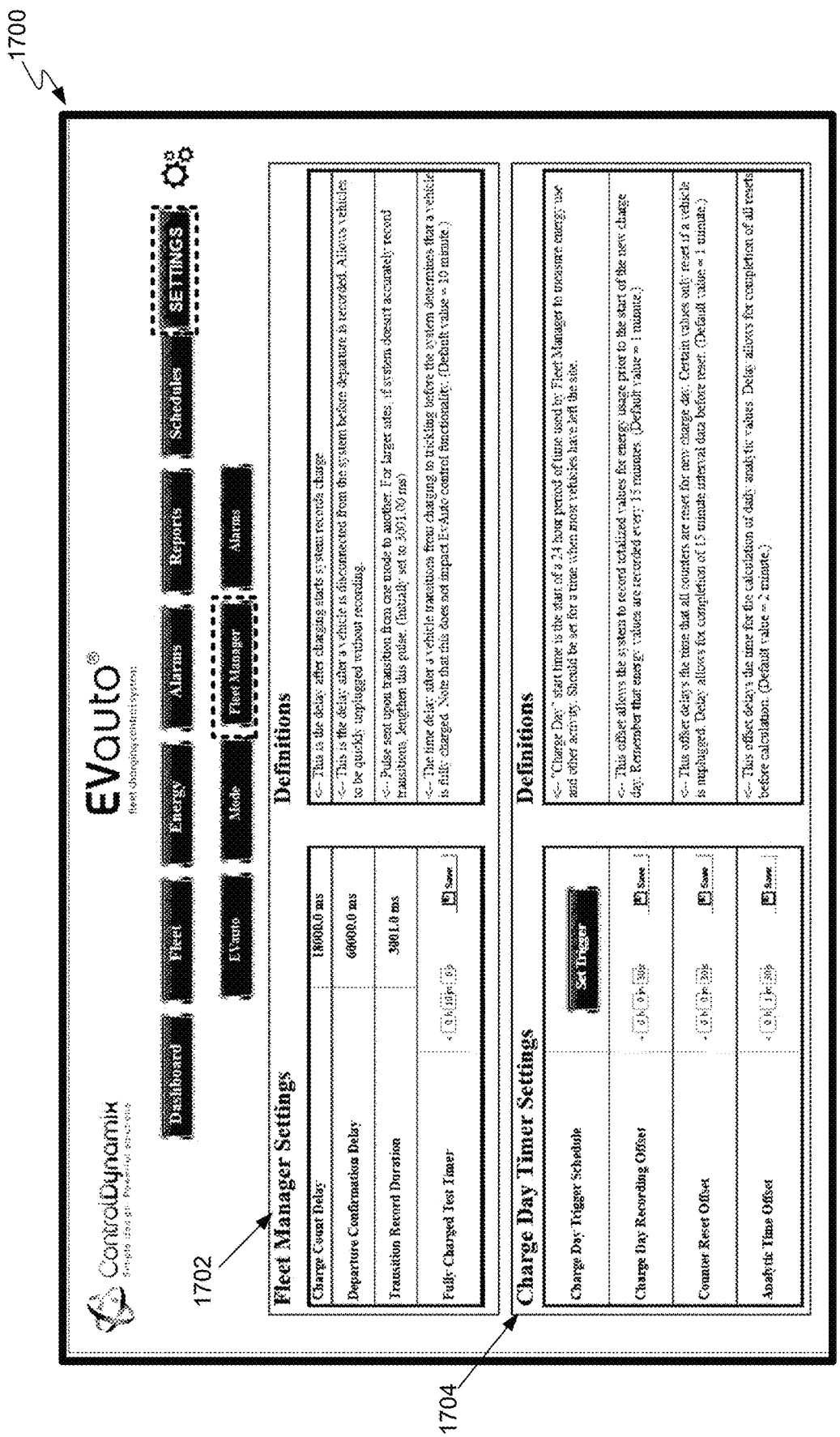
FIG. 17 illustrates an exemplary graphical user interface (GUI) display (displayable on display devices of FIGS. 19-20) for the remote controller that corresponds to the highlighted "Settings" button and the highlighted "Fleet Manager" button which allows the EV fleet owner to input settings for the remote controller.

Referring now to FIG. 17, this figure illustrates an exemplary graphical user interface (GUI) display 1700 (displayable on display devices 1947 of FIGS. 19-20) for the remote controller 114 that corresponds to the highlighted "Settings" button and the highlighted "Fleet Manager" button which allows the EV fleet owner to input settings for the remote controller 114. Specifically, GUI 1700 may allow an EV fleet owner to input some Fleet manager settings 1702 and some Charge day timer settings 1704. Fleet manager settings 1702 may include, but are not limited to: a charge count delay (in milliseconds); a departure confirmation delay (in milliseconds); a transition record duration (in milliseconds); and a fully charged test timer. Meanwhile, Charge day timer settings 1704 may include, but are not limited to: a charge day trigger schedule; a charge day recording offset (in hours, minutes, seconds); a counter reset offset (in hours, minutes, seconds); and an analytic time offset (in hours, minutes, seconds).

Figure 18:
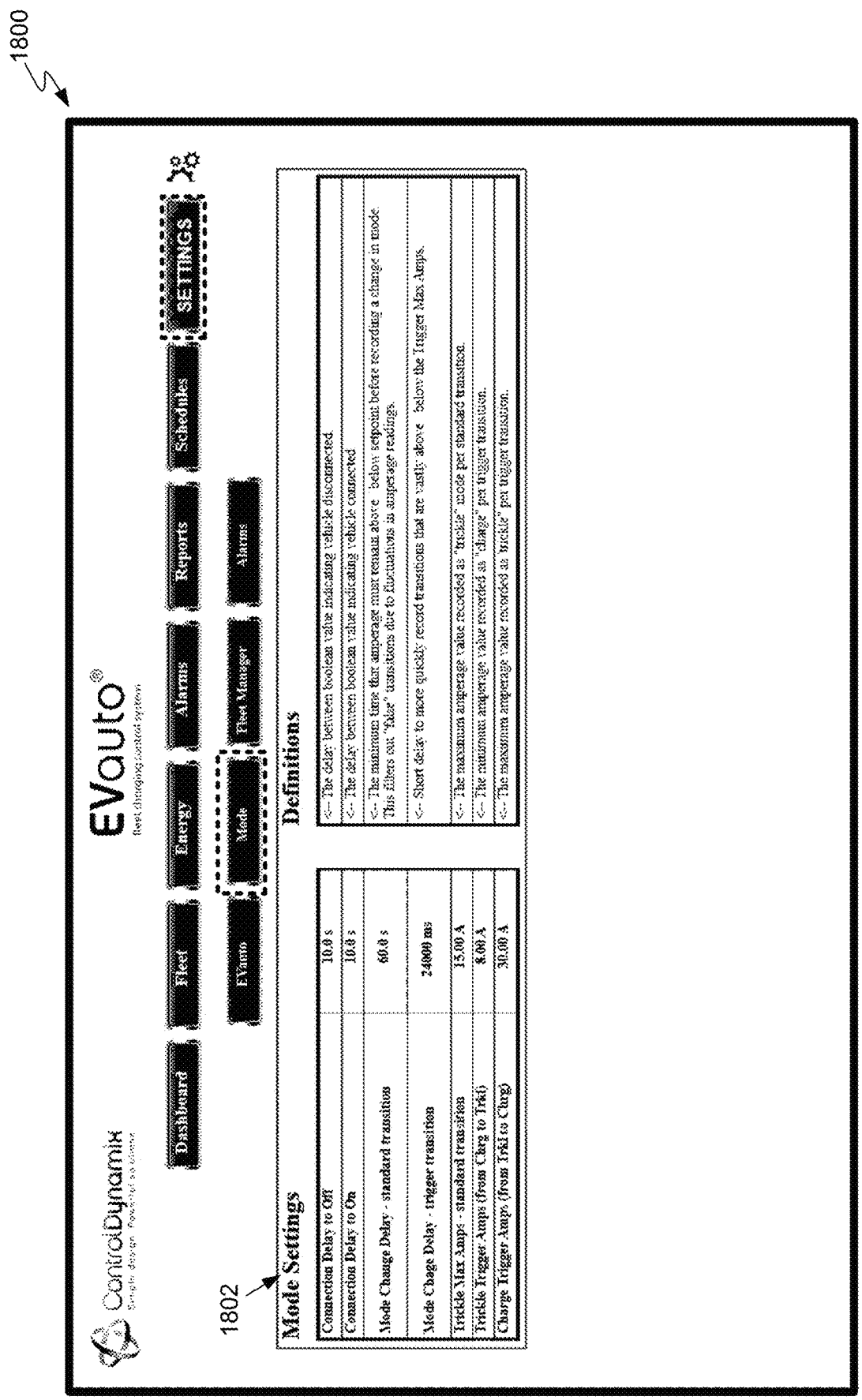
FIG. 18 illustrates an exemplary graphical user interface (GUI) display (displayable on display devices of FIGS. 19-20) for the remote controller that corresponds to the highlighted "Settings" button and the highlighted "Mode" button which allows the EV fleet owner to input settings for charge modes and the meter assigned to each charger.

Referring now to FIG. 18, this figure illustrates an exemplary graphical user interface (GUI) display 1800 (displayable on display devices 1947 of FIGS. 19-20) for the remote controller 114 that corresponds to the highlighted "Settings" button and the highlighted "Mode" button which allows the EV fleet owner to input settings 1802, 1804 for charge modes and the meter 110 assigned to each charger 105. Exemplary charge settings 1802 may include, but are not limited to: connection delay to off (in seconds); connection delay to on (in seconds); mode change delay—standard transition (in seconds); mode change delay—trigger transition (in milliseconds); trickle max amps—standard transition (in amps); trickle trigger amps (from Charge to Trickle) (in amps); and charge trigger amps (from Trickle to Charge) (in amps).

Figure 19:
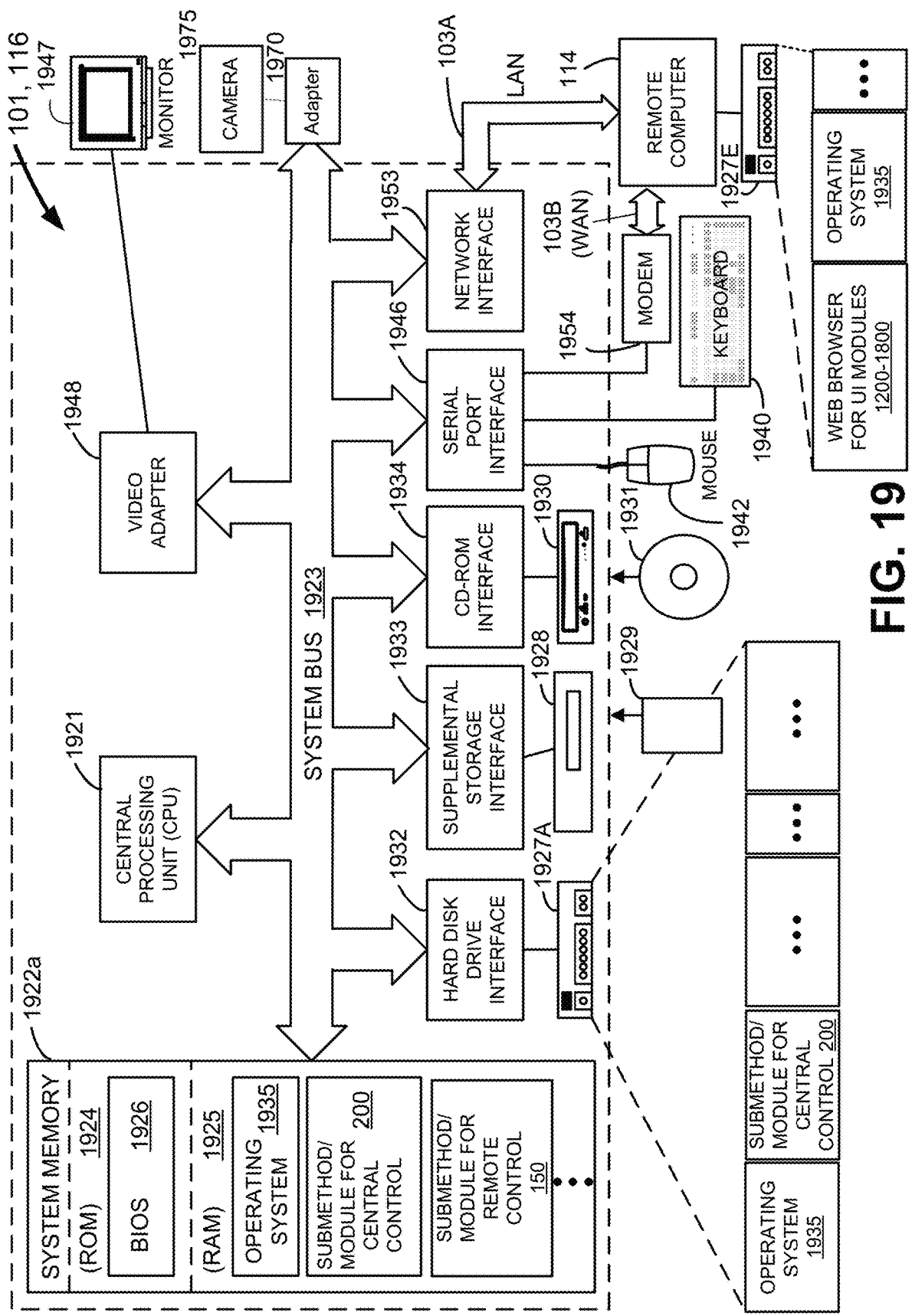
FIG. 19 is a functional block diagram of an Internet connected computer (functioning as the central controller of FIG. 1) and that can be used in the system for controlling the charging of an electric vehicle (EV) fleet, according to one exemplary embodiment.
Figure 20:
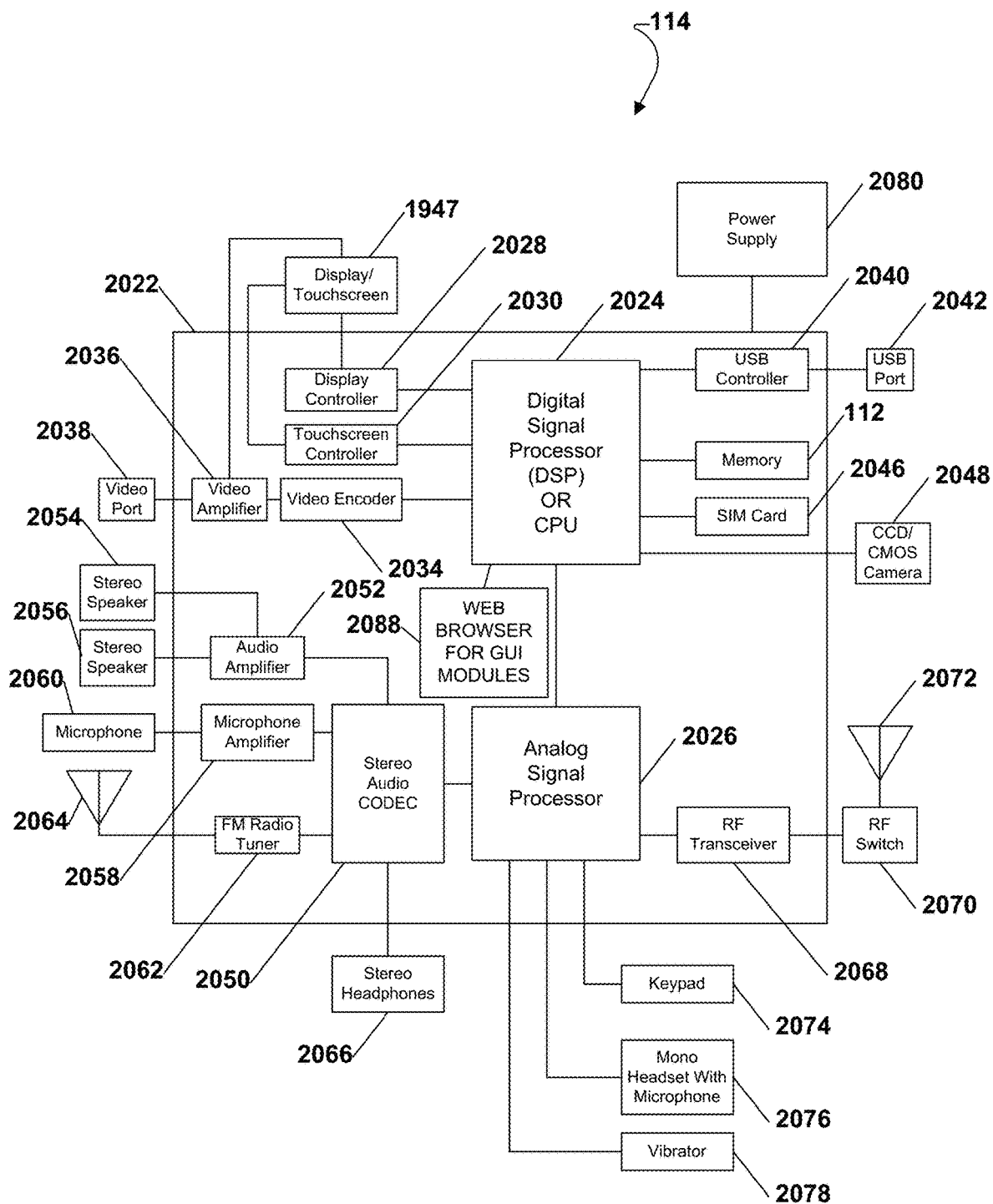
FIG. 20 is a diagram of an exemplary, non-limiting aspect of an Internet connected device comprising a wireless mobile telephone which corresponds with remote controller of FIG. 1.

Referring now to FIG. 19, this figure is a functional block diagram of an Internet connected computer 101 (functioning as the central controller 101 and central server 116 of FIG. 1) and that can be used in the system 200/method 200 for controlling the charging of an electric vehicle (EV) fleet, according to one exemplary embodiment. The exemplary operating environment for the system/method 200 illustrated in FIGS. 1-2A includes a general-purpose computing device in the form of a conventional computer 101, 116 as shown in FIG. 19 and a portable computing device (PCD) 114 as illustrated in FIG. 20.

Generally, a computer 101 (functioning as the central controller 101 or server 116 of FIG. 1) includes a processing unit 1921, a system memory 1922a, and a system bus 1923 that couples various system components including the system memory 1922a to the processing unit 1921.

The system bus 1923 may be any of several types of bus structures including a memory bus or memory controller, a peripheral bus, and a local bus using any of a variety of bus architectures. The system memory includes a read-only memory (ROM) 1924 and a random access memory (RAM) 1925. A basic input/output system (BIOS) 1926, containing the basic routines that help to transfer information between elements within computer 101, such as during start-up, is stored in ROM 1924.

The computer 101 may include a hard disk drive 1927A for reading from and writing to a hard disk, not shown, a supplemental storage drive for reading from or writing to a removable supplemental storage 1929 (like flash memory and/or a USB drive) and an optical disk drive 1930 for reading from or writing to a removable optical disk 1931 such as a CD-ROM or other optical media. Hard disk drive 1927A, magnetic disk drive 1928, and optical disk drive 1930 are connected to system bus 1923 by a hard disk drive interface 1932, a supplemental storage drive interface 1933, and an optical disk drive interface 1934, respectively.

Although the exemplary environment described herein employs hard disk 1927A, removable magnetic disk 1929, and removable optical disk 1931, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in Internet connected devices such as in cellular phones 114 (see FIG. 20) and/or other portable computing devices (PCDs).

The drives 1927A, 1928, 1930 and their associated computer readable media illustrated in FIG. 19 provide nonvolatile storage of computer-executable instructions, data structures, program modules, and other data for computer or client device 101. A number of program modules may be stored on hard disk 1927A, magnetic disk 1929, optical disk 1931, ROM 1924, or RAM 1925, including, but not limited to, an operating system 1935 and the submethod/module 200 (see FIGS. 2A-2B) for central control of charging an electric vehicle (EV) fleet. For the server 116, a program module 150 (See FIG. 2A and subroutine 150) for relaying between the remote controller 114 and central controller 101 may be present.

Program modules include routines, sub-routines, programs, objects, components, data structures, etc., which perform particular tasks or implement particular abstract data types. Aspects of the present invention may be implemented in the form of a downloadable, client-side, central control module 200 which is executed by the computer 101 and/or PCD 114 (see FIG. 20) in order to provide central control in the charging of an EV fleet.

A user may enter commands and information into the computer 101 through input devices, such as a keyboard 1940 and a pointing device 1942. Pointing devices 1942 may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 1921 through a serial port interface 1946 that is coupled to the system bus 1923, but may be connected by other interfaces, such as a parallel port, game port, a universal serial bus (USB), or the like.

The display 1947 may also be connected to system bus 1923 via an interface, such as a video adapter 1948. As noted above, the display 1947 can comprise any type of display devices such as a liquid crystal display (LCD), a plasma display, an organic light-emitting diode (OLED) display, and a cathode ray tube (CRT) display.

The camera 1975 may also be connected to system bus 1923 via an interface, such as an adapter 1970. As noted previously, the camera 1975 can comprise a video camera such as a webcam. The camera 1975 can be a CCD (charge-coupled device) camera or a CMOS (complementary metal-oxide-semiconductor) camera. In addition to the monitor 1947 and camera 1975, the computer 101 (functioning as the remote controller 101 of FIG. 1), may include other peripheral output devices (not shown), such as speakers and printers.

The computer 101 may operate in a networked environment using logical connections to one or more remote computers 114. A remote computer 114 (functioning as the remote controller 114 of FIG. 1) may be another personal computer, a server, a mobile phone 114 (see FIG. 20), a router, a network PC, a peer device, or other common network node. While the remote computer 114 typically includes many or all of the elements described above relative to the general-purpose computer 101 depicted, only a memory storage device 1927E has been illustrated in FIG. 19.

The logical connections depicted in the Figure include a local area network (LAN) 15A and a wide area network (WAN) 15B. Such networking environments are commonplace in offices, enterprise-wide computer networks, intranets, and the Internet.

When used in a LAN networking environment, the computer 101 is often connected to the local area network 103A (which is also the computer communications network 103 of FIG. 1) through a network interface or adapter 1953. The adapter 1953 may be wired or it may be wireless. When used in a WAN networking environment 103B, the computer 101 typically includes a modem 1954 or other means for establishing communications over WAN 103B, such as the Internet.

Modem 1954, which may be internal or external, is connected to system bus 1923 via serial port interface 1946. In a networked environment, program modules depicted relative to the remote controller 114, or portions thereof, may be stored in the remote memory storage device 1927E. It will be appreciated that the network connections shown are exemplary and other means of establishing a communications link between the computer 101 and remote computers/portable computing devices (PCDs) 114 may be used.

Referring to FIG. 20, this figure is a diagram of an exemplary, non-limiting aspect of an Internet connected device comprising a wireless mobile telephone 114 which corresponds with remote controller 114 of FIG. 1. As illustrated in FIG. 19, the remote controller 114 may comprise a computer 114 and/or, as shown in FIG. 20, a personal computing device (PCD), such as a mobile phone 114.

As shown in FIG. 20, the mobile telephone 114 includes an on-chip system 2022 which may have a digital signal processor or a central processing unit 2024 and an analog signal processor 2026 that are coupled together. As illustrated in FIG. 20, a display controller 2028 and a touchscreen controller 2030 are coupled to the digital signal processor/CPU 2024. A touchscreen display 1947 external to the on-chip system 2022 is coupled to the display controller 2028 and the touchscreen controller 2030.

FIG. 20 further illustrates a video encoder 2034, e.g., a phase-alternating line ("PAL") encoder, a sequential couleur avec memoire ("SECAM") encoder, a national television system(s) committee ("NTSC") encoder or any other video encoder, is coupled to the digital signal processor/CPU 2024. Further, a video amplifier 2036 is coupled to the video encoder 2034 and the touchscreen display 1947. A video port 2038 is coupled to the video amplifier 2036. As depicted in FIG. 20, a universal serial bus ("USB") controller 2040 is coupled to the digital signal processor/CPU 2024. Also, a USB port 2042 is coupled to the USB controller 2040. A memory 112 and a subscriber identity module ("SIM") card 2046 may also be coupled to the digital signal processor/CPU 2024.

Further, as shown in FIG. 20, a digital camera 2048 may be coupled to the digital signal processor/CPU 2024. In an exemplary aspect, the digital camera 2048 is a charge-coupled device ("CCD") camera or a complementary metal-oxide semiconductor ("CMOS") camera.

As further illustrated in FIG. 20, a stereo audio CODEC 2050 may be coupled to the analog signal processor 2026. Moreover, an audio amplifier 2052 may be coupled to the stereo audio CODEC 2050. In an exemplary aspect, a first stereo speaker 2054 and a second stereo speaker 2056 are coupled to the audio amplifier 2052. FIG. 20 shows that a microphone amplifier 2058 may be also coupled to the stereo audio CODEC 2050. Additionally, a microphone 2060 may be coupled to the microphone amplifier 2058. In a particular aspect, a frequency modulation ("FM") radio tuner 2062 may be coupled to the stereo audio CODEC 2050. Also, an FM antenna 2064 is coupled to the FM radio tuner 2062. Further, stereo headphones 2066 may be coupled to the stereo audio CODEC 2050.

FIG. 20 further illustrates a radio frequency ("RF") transceiver 2068 that may be coupled to the analog signal processor 2026. An RF switch 2070 may be coupled to the RF transceiver 2068 and an RF antenna 2072. The RF transceiver 2068 may communicate with conventional communications networks 103 as well as with global positioning system ("GPS") satellites in order to obtain GPS signals for geographical coordinates.

As shown in FIG. 20, a keypad 2074 may be coupled to the analog signal processor 2026. Also, a mono headset with a microphone 2076 may be coupled to the analog signal processor 2026. Further, a vibrator device 2078 may be coupled to the analog signal processor 2026. FIG. 20 also shows that a power supply 2080 may be coupled to the on-chip system 2022. In a particular aspect, the power supply 2080 is a direct current ("DC") power supply that provides power to the various components of the mobile telephone 114 that require power. Further, in a particular aspect, the power supply is a rechargeable DC battery or a DC power supply that is derived from an alternating current ("AC") to DC transformer that is connected to an AC power source.

FIG. 20 also shows that the mobile telephone 114 may include a web browser 2088 running on the DSP or CPU 2024 that can communicate with the server 116. The server 116 provides GUIs 1200-1800 of FIGS. 12-18 that may be accessed with the web browser software 2088.

As depicted in FIG. 20, the touchscreen display 1947, the video port 2038, the USB port 2042, the camera 2048, the first stereo speaker 2054, the second stereo speaker 2056, the microphone 2060, the FM antenna 2064, the stereo headphones 2066, the RF switch 2070, the RF antenna 2072, the keypad 2074, the mono headset 2076, the vibrator 2078, and the power supply 2080 are external to the on-chip system 2022.

In a particular aspect, one or more of the method steps described above (such as illustrated in FIGS. 2A-2C) may be stored in the memory 112 (of FIG. 20), 1922a (of FIG. 19), 1922b (of FIG. 1) as computer program instructions. These instructions may be executed by the digital signal processor or central processing unit 2024 (of FIG. 20), the analog signal processor 2026 (of FIG. 20), CPU 1921 (of FIG. 19), or another processor, and/or any combination of processors, to perform the methods described herein. Further, the processors, 1921, 2024, 2026, the memories 112, 1922a, 1922b and the instructions stored therein, or a combination thereof may serve as a means for performing one or more of the method steps described herein, and as claimed in any means-plus-function claims. It is recognized that each processor 1921, 2024, 2026 may comprise one or more processing cores as understood by one of ordinary skill in the art.

TABLE 1

COMPARISON BETWEEN FOCUSED AND SEMI-LEVEL CHARGING STRATEGIES

| FcFs - Focused Charging Strategy Selected [STEP 205] | | | | Semi-Level (S/L) Charging Strategy Selected [STEP 205] | | | |
|---|---|---|---|---|---|---|---|
| Time 1 | CIV | CpIndex | Charge Level | Time 1 | CIV | CpIndex | Charge Level |
| CP01 | 0 | 1 | OFF | CP01 | 0 | 1 | OFF |
| CP02 | 0 | 2 | OFF | CP02 | 0 | 2 | OFF |
| CP03 | 0 | 3 | OFF | CP03 | 0 | 3 | OFF |
| Time 2 | CIV | CpIndex | Charge Level | Time 2 | CIV | CpIndex | Charge Level |
| CP01 | 1 | 1 | 25% | CP01 | 1 | 1 | 25% |
| CP02 | 1 | 2 | OFF | CP02 | 1 | 2 | OFF |
| CP03 | 1 | 3 | OFF | CP03 | 1 | 3 | OFF |
| Time 3 | CIV | CpIndex | Charge Level | Time 3 | CIV | CpIndex | Charge Level |
| CP01 | 2 | 1 | 50% | CP01 | 2 | 1 | 25% |
| CP02 | 2 | 2 | OFF | CP02 | 2 | 2 | 25% |
| CP03 | 2 | 3 | OFF | CP03 | 2 | 3 | OFF |
| Time 4 | CIV | CpIndex | Charge Level | Time 4 | CIV | CpIndex | Charge Level |
| CP01 | 3 | 1 | 75% | CP01 | 3 | 1 | 25% |
| CP02 | 3 | 2 | OFF | CP02 | 3 | 2 | 25% |
| CP03 | 3 | 3 | OFF | CP03 | 3 | 3 | 25% |

Table 1 listed above provides two exemplary embodiments of the system and method 200. Table 1 demonstrates how the Charge intensity variable/value (CIV) impacts the rate at which EVs 105 are charged and how the Charge priority index (CpIndex) impacts which EVs 102 receive a charge at a given instant of time. Table 1 compares the first-come-first-served (FcFs)/Focused Charging Strategy [see Routine 245—FIG. 2C] against the Semi-Level (S/L) Charging Strategy [see Routine 240—FIG. 2C].

In Table 1, there are three chargers 105 in the EV fleet 102, which are labeled in the table as Charger Points ("CP") 01, 02, 03. Each charger in the table has four (4) Controllable Charge Levels: 25%/50%/75%/100%. As noted previously, an "Off" (0%) mode for a charger 105 is also a level as implied by the formulas listed above.

In Table 1, all CP's 01, 02, 03 are connected to EVs 102 that aren't full (i.e. not fully charged.) And the EV prioritization, or CpIndex is set to arrival order, and EVs 102 have arrived in the numerical order of the chargers (i.e. CP01=first EV 102 arrival at facility 200; CP02=second EV 102 arrival at facility 200; and CP03=third EV 102 arrival at facility 200).

At Time 1 under both strategies, the CIV value is zero, while the CpIndex is based on the arrival times for the three EVs 102. Next, at Time 2, under the FcFs charging strategy, the CIV increased to the value of "1." With that increase, the first charger, CP01, having the highest priority of "1" had it's charge level raised from "OFF" to its first charge level of 25%.

Meanwhile, at Time 2, under the S/L strategy, the CIV also increased to a value "1." As noted previously, the CIV can change if the Fleet Owner changes a setting, or if more electric power is available, or if an electrical demand response strategy has ended, etc. etc. The CIV changes based on several other variables described above.

And with that increase in the CIV at Time 2 under the S/L charging strategy, the first charger, CP01, having the highest priority of "1" had its charge level raised from "OFF" to its first charge level of 25%.

Next, at Time 3, the CIV increases from "1" to a "2" under both strategies. Under the FcFs strategy, because of this increase in the CIV and because of the CpIndex of 1 for the first charger CP01, the central controller 101 raises the charge level of the first charger CP01 from 25% to 50%. Meanwhile, the other two chargers CP02, CP03 remain in an "OFF" state.

At Time 3 under the S/L charging strategy, because of this increase in the CIV and because of the CpIndex of 2 for the second charger CP02, the central controller 101 raises the charge level of the second charger CP02 from zero to 25%. Meanwhile, the first charger CP01 remains at its prior level of 25% and the third charger CP03 remains in its "OFF" state.

At Time 4, the CIV increases from a value of "2" to a value of "3." Under the FcFs strategy, because of this increase in the CIV and because of the CpIndex of 1 for the first charger CP01, the central controller 101 raises the charge level of the first charger CP01 from 50% to 75%. Meanwhile, the other two chargers CP02, CP03 remain in an "OFF" state.

At Time 4 under the S/L charging strategy, because of this increase in the CIV and because of the CpIndex of 3 for the third charger CP03, the central controller 101 raises the charge level of the third charger CP03 from zero to 25%. Meanwhile, the first charger CP01 remains at its prior level of 25% and the second charger CP02 also remains at its prior level of 25%.

Those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules 150, 200 may be located in both local and remote memory storage devices.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc and/or portable storage medium, as used herein, includes USB drives (aka "thumb drives"), compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

The exemplary embodiments of the inventive method and system 100 described above are interchangeable as understood by one of ordinary skill in the art. Various embodiments may be combined with other embodiments without departing from the scope of this disclosure. That is, one or more embodiments illustrated in the several figures may be combined together.

As but one non-limiting example of a potential combination of exemplary embodiments, the exemplary embodiments showing the GUIs illustrated in FIGS. 12A-12C could be combined with later embodiments in other figures, such as, but not limited to, those GUIs found in FIGS. 13-18. Other combinations of the exemplary embodiments, beyond just the GUIs, are possible and are included within the scope of this disclosure as understood by one of ordinary skill in the art.

Certain steps in the processes or process flows enabled by the mechanical drawings in this specification and the appendix naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims.

For example, while each EV 102 has a separate meter 110, it is possible that the functions of these elements could be replaced/substituted by additional and/or fewer structures. As one case for fewer structures, it is possible that two EVs could share a single meter 110, but where that meter has separate registers/memory/storage for values recorded against the separate vehicles.

As shown in FIG. 1 with a dashed line, in a possible alternative exemplary embodiment, a direct communication link 107h could exist between the remote controller 114 and the central controller 101, which could eliminate the central server 116. In such an embodiment, the remote controller 114 could be programmed with the logic of the central server 116 such that the remote controller 114 could render the GUIs of FIGS. 12-18 directly.

Further, electrical and/or mechanical equivalents of any of the illustrated structures could be substituted for many of the structures illustrated in the several views as understood by one of ordinary skill in the art. Such substitutions of mechanical/electrical equivalent structures are included within the scope of this disclosure.

Similarly, in the claims, means-plus-function clauses are intended to cover the structures described herein as performing the recited function and not only structural equivalents, but also equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A computer-implemented method for charging an electric vehicle fleet comprising:
   providing a plurality of chargers for the electric vehicle fleet, each charger supporting charging for a single electric vehicle;
   receiving a selection of at least one of a first charging strategy and a second charging strategy with a central controller from a remote controller, the central controller being positioned in proximity to the plurality of chargers and being in communication with the plurality of chargers, the remote controller existing remote and independent relative to the central controller and relative to the plurality of chargers, the first charging strategy comprising a focused charging strategy for a portion of the electric vehicle fleet that is coupled to the chargers, the second charging strategy comprising a semi-level charging strategy for charging an entirety of the electric vehicle fleet that is coupled to the chargers;
   determining with the central controller a charge priority index value for each charger connected to an electric vehicle, the charge priority index value addresses a sequence in which chargers are turned on relative to each other and a sequence in which charge levels of chargers are increased relative to each other;
   determining a charge intensity value with the central controller that is associated with a total number of vehicles needing charging and that are connected to the chargers, the charge intensity value being dependent on a magnitude of the total number of vehicles, and the charge intensity value also being dependent on the selected charging strategy;
   when the first charging strategy is received by the central controller and depending upon the charge intensity value and charge priority index value for each charger, then the central controller changes a state for chargers associated with the portion of the electric vehicle fleet, where chargers associated with the portion of the fleet and having a higher priority index value are turned on first relative to chargers having a lower priority index value, and chargers associated with the portion of the electric vehicle fleet and turned on having a higher priority index value have charge levels increased faster relative to chargers turned on having a lower priority index value; and
   when the second charging strategy is received by the central controller and depending upon a comparison between the charge intensity value and charge priority index value for each charger, then the central controller turns on each charger at its lowest charge level, and as the charge intensity value increases, the central controller increases a charge level for each charger.

2. The method of claim 1, wherein determining the charge intensity value with a processor further comprises calculating with the central controller how a selected effective power consumption set point for a charging facility impacts the charge intensity value.

3. The method of claim 2, further comprising creating a schedule of times with the central controller for changing the selected effective power consumption set point for the charging facility.

4. The method of claim 1, wherein determining the charge priority index value for each charger connected to an electric vehicle with the central controller further comprises determining an arrival time of each electric vehicle with the central controller when each electric vehicle is connected to a respective charger.

5. The method of claim 1, wherein each charger has a plurality of charge levels for charging an electric vehicle.

6. The method of claim 1, wherein a charge level for a charger comprises a percentage setting relative to electric power available to the charger.

7. The method of claim 1, wherein the electric vehicle fleet comprises at least one of cars, trucks, motorcycles, scooters, boats, trains, busses, aircraft, military vehicles, heavy-duty work machines, and remote controlled devices.

8. The method of claim 1, wherein determining the charge priority index value for each charger and determining the charge intensity value with the central controller are executed without being dependent on an Internet connection.

9. A computer-implemented system for charging an electric vehicle fleet comprising:
   a remote controller coupled to a central controller;
   a plurality of chargers for charging the electric vehicle fleet, each charger supporting charging for a single electric vehicle, the central controller being positioned in proximity to the plurality of chargers and being in communication with the plurality of chargers, the remote controller existing remote and independent relative to the central controller and relative to the plurality of chargers;
   the central controller receiving from the remote controller a selection of at least one of a first charging strategy and a second charging strategy, the first charging strategy comprising a focused charging strategy for a portion of the electric vehicle fleet that is coupled to the chargers, the second charging strategy comprising a semi-level charging strategy for charging an entirety of the electric vehicle fleet that is coupled to the chargers; the central controller determining a charge priority index value for each charger connected to an electric vehicle, the charge priority index value addresses a sequence in which chargers are turned on relative to each other and a sequence in which charge levels of chargers are increased relative to each other; the central controller determining a charge intensity value that is associated with a total number of vehicles needing charging and that are connected to the chargers, the charge intensity value that corresponds with being dependent on a magnitude of the total number of vehicles, and the charge intensity value also being dependent on the selected charging strategy;
   when the first charging strategy is received by the central controller and depending upon the charge intensity value and charge priority index value determined for each charger, the central controller changes a state for chargers associated with the portion of the electric vehicle fleet having a higher priority index value are turned on first relative to chargers having a lower priority index value, and chargers turned on having a higher priority index value have charge levels increased faster relative to chargers turned on having a lower priority index value; when the second charging strategy is received by the central controller and depending upon a comparison between the charge intensity value and charge priority index value for each charger, the central controller turns on each charger at its lowest charge level, and as the charge intensity value increases, the central controller increases a charge level for each charger.

10. The system of claim 9, wherein the central controller calculates how a selected effective power consumption set point for a charging facility impacts the charge intensity value.

11. The system of claim 10, wherein the central controller creates a schedule of times for changing the selected effective power consumption set point for the charging facility.

12. The system of claim 9, wherein the central controller determines a charge priority index value for each charger connected to an electric vehicle by determining an arrival time of each electric vehicle when each electric vehicle is connected to a respective charger.

13. The system of claim 9, wherein each charger has a plurality of charge levels for charging an electric vehicle.

14. The system of claim 9, wherein a charge level for a charger comprises a percentage setting relative to electric power available to the charger.

15. The system of claim 9, wherein the electric vehicle fleet comprises at least one of cars, trucks, motorcycles, scooters, boats, trains, busses, aircraft, military vehicles, heavy-duty work machines, and remote controlled devices.

16. The system of claim 9, wherein determining a charge priority index value for each charger by the central controller and determining a charge intensity value by the central controller are completed by the central controller without an Internet connection.

* * * * *